(12) United States Patent
York et al.

(10) Patent No.: US 7,602,271 B2
(45) Date of Patent: Oct. 13, 2009

(54) ELECTRONICALLY ACTUATED APPARATUS USING SOLENOID ACTUATOR WITH INTEGRATED SENSOR

(75) Inventors: Todd M York, Howell, MI (US); Andrew F Pinkos, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 297 days.

(21) Appl. No.: 11/507,311

(22) Filed: Aug. 21, 2006

(65) Prior Publication Data

US 2008/0042791 A1 Feb. 21, 2008

(51) Int. Cl.
*H01F 3/00* (2006.01)
*H01F 7/08* (2006.01)

(52) U.S. Cl. .............. 335/279; 335/220; 335/249; 335/261; 335/265; 324/207.22; 324/207.2; 324/207.26; 324/226

(58) Field of Classification Search .......... 335/220, 335/249, 261, 265, 279; 324/207.22, 207.2, 324/207.26, 226
See application file for complete search history.

(56) References Cited

U.S. PATENT DOCUMENTS

| | | | |
|---|---|---|---|
| 3,133,454 A | 5/1964 | Padlo | |
| 3,414,100 A | 12/1968 | Spencer | |
| 3,732,752 A | 5/1973 | Louckes et al. | |
| 3,789,876 A | 2/1974 | Kempton et al. | |
| 3,949,841 A | 4/1976 | Jovick et al. | |
| 4,090,592 A | 5/1978 | Jovick et al. | |
| 4,263,824 A | 4/1981 | Mueller | |
| 4,321,946 A | 3/1982 | Paulos et al. | |
| 4,662,499 A | 5/1987 | Jordan | |
| 4,781,078 A | 11/1988 | Blessing et al. | |
| 4,805,486 A | 2/1989 | Hagiwara et al. | |
| 4,864,231 A | 9/1989 | Okumura et al. | |
| 4,955,853 A | 9/1990 | Bausch | |
| 5,019,021 A | 5/1991 | Janson | |
| 5,030,181 A | 7/1991 | Keller | |
| 5,032,812 A * | 7/1991 | Banick et al. ............ 335/17 |
| 5,092,825 A | 3/1992 | Goscenski, Jr. et al. | |
| 5,098,360 A | 3/1992 | Hirota | |
| 5,157,966 A | 10/1992 | Lugosi et al. | |
| 5,308,171 A | 5/1994 | Sakamoto | |
| 5,313,161 A | 5/1994 | Miyazawa et al. | |
| 5,350,340 A | 9/1994 | Paul et al. | |

(Continued)

FOREIGN PATENT DOCUMENTS

DE      8633084 U1      5/1987

(Continued)

*Primary Examiner*—Elvin G Enad
*Assistant Examiner*—Mohamad A Musleh
(74) *Attorney, Agent, or Firm*—Harness, Dickey & Pierce, P.L.C.

(57) ABSTRACT

An electromagnetic actuator assembly that includes an annular frame, a coil assembly, an annular armature, a plunger and a sensor. The coil assembly is coupled to the frame and includes an annular core and an annular coil. The annular armature is received in the frame and abutted against the plunger. A sensor target can be coupled to the armature or the plunger and includes a radially outwardly extending sensor target. The sensor is coupled to the frame and configured to sense a position of the sensor target. A method for operating an electromagnetic actuator is also provided.

30 Claims, 21 Drawing Sheets

U.S. PATENT DOCUMENTS

| | | | |
|---|---|---|---|
| 5,366,421 A | 11/1994 | Hirota | |
| 5,451,868 A | 9/1995 | Lock | |
| 5,486,757 A | 1/1996 | Easley | |
| 5,523,684 A | 6/1996 | Zimmermann | |
| 5,593,132 A | 1/1997 | Hrytzak | |
| 5,682,097 A | 10/1997 | Bryant et al. | |
| 5,816,971 A | 10/1998 | Zentmyer et al. | |
| 5,867,092 A | 2/1999 | Vogt | |
| 5,878,779 A * | 3/1999 | Bircann et al. | 137/554 |
| 5,911,643 A | 6/1999 | Godlew et al. | |
| 5,942,892 A | 8/1999 | Li | |
| 5,984,823 A | 11/1999 | Gage | |
| 5,989,147 A | 11/1999 | Forrest et al. | |
| 5,998,988 A | 12/1999 | Dickmeyer et al. | |
| 6,013,004 A | 1/2000 | Gage et al. | |
| 6,038,506 A | 3/2000 | Dickhans et al. | |
| 6,083,134 A | 7/2000 | Godlew | |
| 6,133,729 A | 10/2000 | Mierzwinski | |
| 6,203,464 B1 | 3/2001 | Ishikawa et al. | |
| 6,283,884 B1 | 9/2001 | El-Kassouf | |
| 6,309,321 B1 | 10/2001 | Valente | |
| 6,334,832 B1 | 1/2002 | Heravi et al. | |
| 6,428,441 B1 | 8/2002 | Hunt | |
| 6,436,002 B1 | 8/2002 | Ishikawa et al. | |
| 6,450,914 B1 | 9/2002 | Irwin et al. | |
| 6,454,068 B2 | 9/2002 | Arai et al. | |
| 6,460,677 B1 | 10/2002 | Roscoe | |
| 6,470,988 B1 | 10/2002 | Beesley | |
| 6,478,708 B2 | 11/2002 | Krisher | |
| 6,488,606 B1 | 12/2002 | Young et al. | |
| 6,503,167 B1 | 1/2003 | Sturm | |
| 6,527,664 B2 | 3/2003 | Hunt | |
| 6,537,979 B1 | 3/2003 | Kuo et al. | |
| 6,871,961 B2 | 3/2005 | Balu et al. | |
| 6,948,697 B2 * | 9/2005 | Herbert et al. | 251/129.04 |
| 6,958,030 B2 | 10/2005 | DeGowske | |
| 7,017,723 B2 | 3/2006 | Yasui et al. | |
| 7,022,040 B2 | 4/2006 | DeGowske et al. | |
| 7,211,020 B2 | 5/2007 | Gohl et al | |
| 7,233,087 B2 * | 6/2007 | Watson | 310/80 |
| 7,384,359 B2 | 6/2008 | Pinkos | |
| 7,425,185 B2 | 9/2008 | Donofrio et al. | |
| 2002/0032096 A1 | 3/2002 | Gassmann | |
| 2002/0155913 A1 | 10/2002 | Fusegi et al. | |
| 2003/0218392 A1 * | 11/2003 | Frey et al. | 310/68 B |
| 2004/0132572 A1 | 7/2004 | Ludwig et al. | |
| 2005/0187063 A1 | 8/2005 | Haruki | |
| 2005/0250613 A1 | 11/2005 | Ludwig et al. | |
| 2005/0279607 A1 | 12/2005 | Fusegi | |
| 2006/0130785 A1 * | 6/2006 | Han et al. | 123/90.11 |
| 2006/0270508 A1 * | 11/2006 | Gohl et al. | 475/220 |
| 2006/0270509 A1 * | 11/2006 | Pinkos | 475/220 |
| 2006/0270512 A1 | 11/2006 | Pinkos | |
| 2009/0011889 A1 | 1/2009 | Haske et al. | |

FOREIGN PATENT DOCUMENTS

| | | |
|---|---|---|
| EP | 1 435 479 A2 | 7/2004 |
| JP | 2001107983 | 4/2001 |
| JP | 2001193821 | 7/2001 |

* cited by examiner

ELECTRONICALLY ACTUATED APPARATUS USING SOLENOID ACTUATOR WITH INTEGRATED SENSOR

INTRODUCTION

The present disclosure generally relates electronically actuated driveline components such as differentials and transfer cases. More particularly, the present disclosure relates to an electronically actuated driveline component that employs a solenoid actuator with an integrated sensor.

It is known in the vehicle axle art to employ an electromagnetic actuator to translate members of an assembly into/out of engagement with one another. For example, commonly owned U.S. Pat. No. 6,958,030 discloses an electromagnetic locking differential assembly that employs an electromagnetic actuator to selectively couple a side gear to a differential case to cause the differential assembly to operate in a fully locked condition. More specifically, the electromagnetic actuator is actuated to axially translate an actuating ring (which is non-rotatably coupled to the differential case) such that dogs on the actuating ring matingly engage dogs that are formed on a face of the side gear opposite the gear teeth. As another example, U.S. Patent Application Publication No. 2004/0132572 discloses an electromagnetic locking differential assembly that employs an electromagnetic actuator to selectively operate a ball ramp plate to lock a side gear to a differential case so that the differential operated in a fully locked condition.

It is typically necessary to provide a signal to the vehicle controller to identify the state in which these driveline components are operating. For example, the vehicle controller may control various vehicle systems (e.g., ABS, TCS and/or ESP systems) in one manner if the driveline component is operating in a first condition and in another manner if the driveline component is operating in a different condition. Accordingly, these electromagnetically-actuated driveline components typically include a sensor, such as a Hall-effect sensor, that is employed to identify a position of an axially translated member, such as the actuating ring of the '030 patent.

Typically, such sensors are mounted via brackets to a stationary structure. In the '572 patent application publication for example a bracket member is bolted to an outer differential housing. The bracket member is employed to retain the electromagnetic actuator to the outer differential housing, as well as to hold the sensor (via an integral sensor bracket). The sensor is received through a slotted opening in the sensor bracket, which permits the sensor to be moved parallel to the axis of actuation. It will be appreciated that the sensor must be accurately positioned to identify the position of the axially translating member that corresponds to operation of the driveline component in the actuated mode (e.g., the fully locked mode for an electromagnetic locking differential assembly). Stated another way, the sensor is not simply aligned to the axially translatable member, but rather to the axially translatable member when the driveline component is actuated.

It will be appreciated that the actual position of the sensor can be a highly complex function that is influenced by the tolerances of several different elements in the drive train component. In the example of the differential disclosed in the '572 patent application publication, it will be appreciated that these tolerances include: the amount of backlash between the side bear and the pinion gears, the length of the pin members, the thickness of the plate-like member, the location of the sensed member relative to the radially extending connector portions of the plate-like member, the thickness of the ball-ramp actuator, the thickness of the gear case end wall, the thickness of the bracket member and the location of the snap ring that retains the bracket member to the gear case end wall.

Given the numerous tolerances that typically affect the operational condition of a locking differential, the typical assembly procedure includes setting of the lash between the side and pinion gears, assembling the actuator system to the differential, activating the actuator assembly to lock the differential in a fully-locked condition and thereafter setting a location of a sensor relative to a sensor target. It will be appreciated that such electromagnetically actuated driveline components can be relatively expensive due to the complexity of the sensor target and the labor required for setting the position of the sensor.

SUMMARY

In one form, the present teachings provide an electromagnetic actuator assembly that includes a frame member, a coil assembly, a plunger, an armature, a sensor target and a sensor. The frame member has an outer sidewall, an inner sidewall and a first end wall that is coupled to the inner and outer sidewalls. The frame member defining an interior annular cavity. The coil assembly is mounted in the annular cavity and includes a core and a coil. The plunger has an annular intermediate wall and a second end wall that extends radially inwardly from the intermediate wall. The intermediate wall is disposed between the coil assembly and the outer sidewall. The armature abuts the plunger. The sensor target is coupled to one of the armature and the plunger. The sensor is mounted to the frame and configured to sense a position of the sensor target and to produce a first sensor signal when the sensor target is moved in a first direction past a first position and the sensor is in a first state.

In another form, the present teachings provide a method that includes: providing an actuator having a frame member, a coil assembly, a plunger, an armature and a sensor target, the frame member having an outer sidewall, an inner sidewall and a first end wall that is coupled to the inner and outer sidewalls, the frame member defining an interior annular cavity, the coil assembly being mounted in the annular cavity and including a core and a coil, the plunger having an annular intermediate wall and a second end wall that extends radially inwardly from the intermediate wall, the intermediate wall being disposed between the coil assembly and the outer sidewall, the armature being coupled to the intermediate wall, the sensor target being coupled to one of the armature and the plunger and extending radially outwardly of the intermediate wall; and sensing a position of the sensor target relative to the frame member.

In yet another form, the present teachings provide an electromagnetic actuator assembly that includes an annular frame, a coil assembly, an annular armature and a sensor. The coil assembly is coupled to the frame and includes an annular core and an annular coil. The annular armature is received in the frame and includes a radially outwardly extending sensor target. The sensor is coupled to the frame and configured to sense a position of the sensor target.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
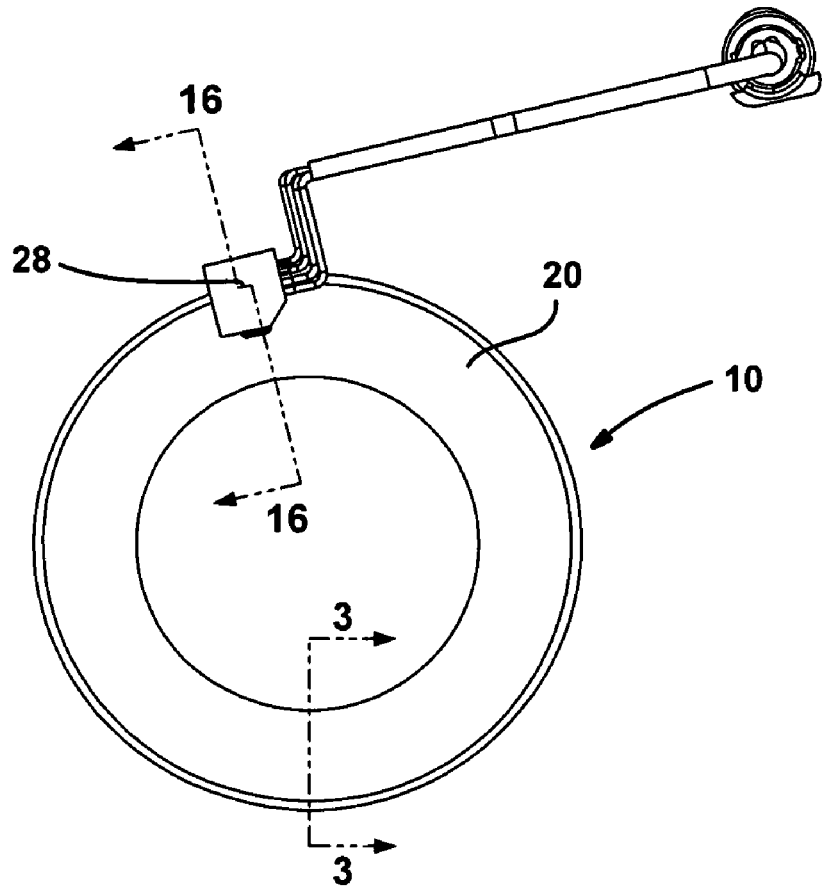
FIG. 1 is a front view of an actuator assembly constructed in accordance with the teachings of the present disclosure.
Figure 2:
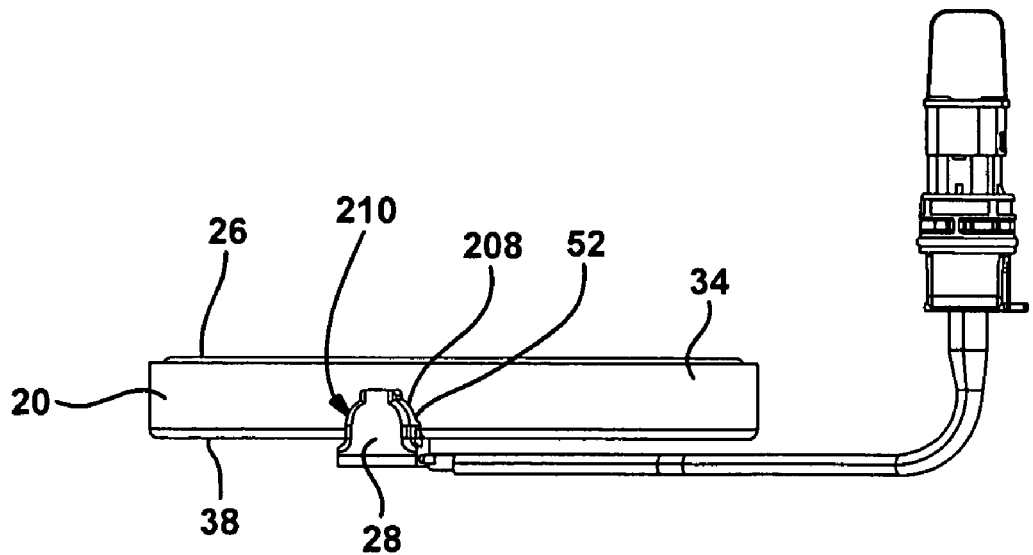
FIG. 2 is a side elevation of the actuator assembly of FIG. 1.
Figure 3:
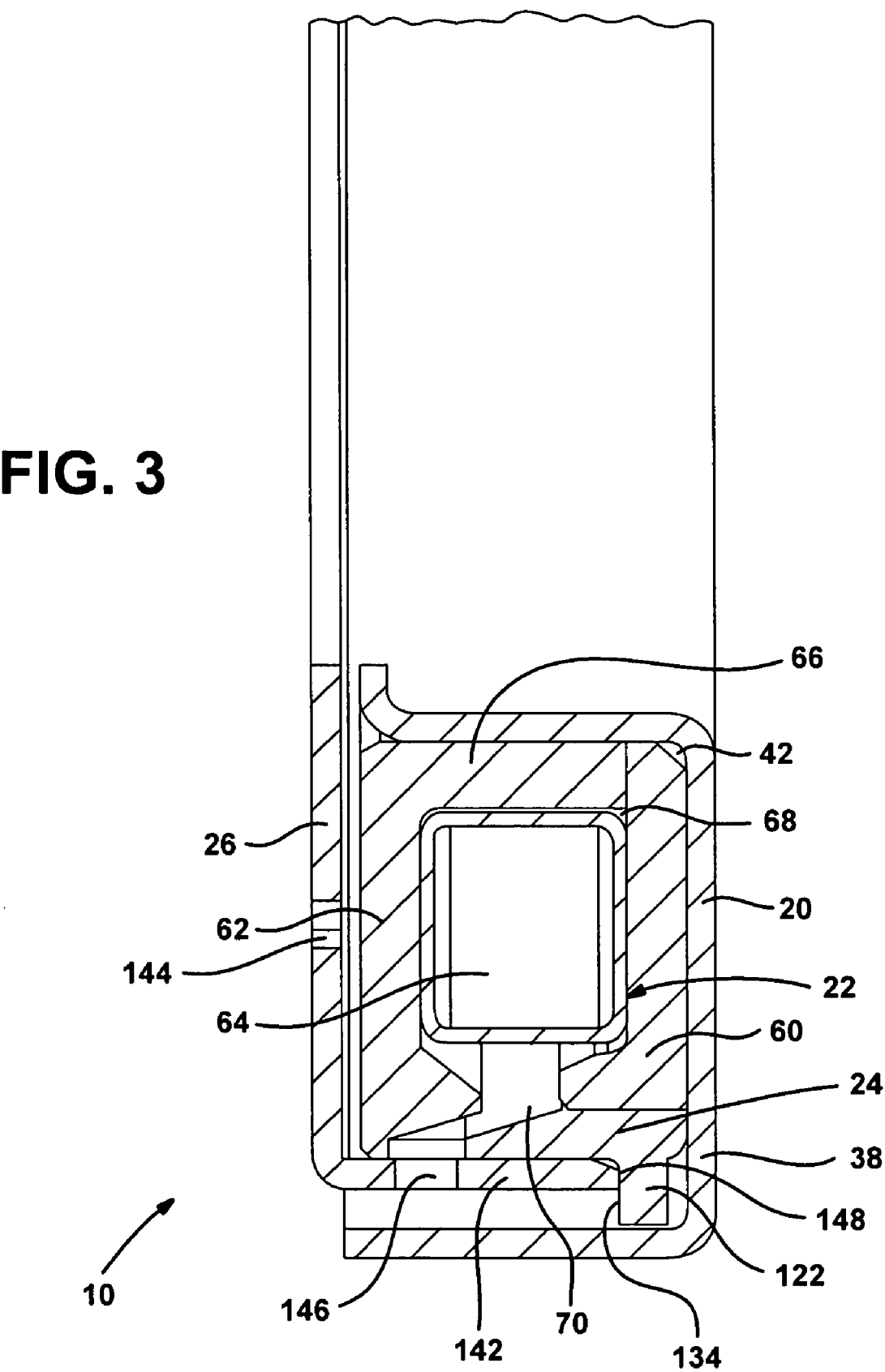
FIG. 3 is a sectional view taken along the line 3-3 of FIG. 1.

With reference to FIGS. 1 through 3 of the drawings, an actuator assembly constructed in accordance with the teachings of the present invention is generally indicated by reference numeral 10. The actuator assembly 10 can include a frame 20, a coil assembly 22, an armature 24, a plunger 26 and a sensor assembly 28.

Figure 5:
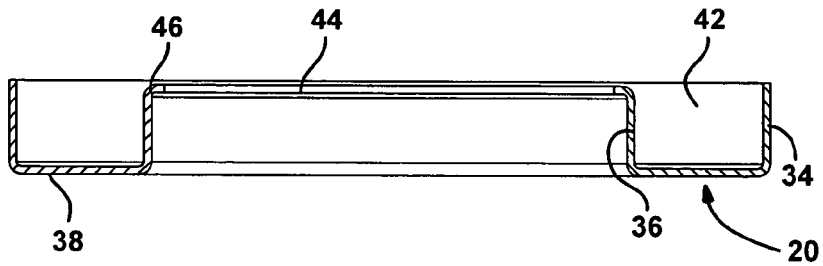
FIG. 5 is a section view taken along the line 5-5 of FIG. 4.
Figure 4:
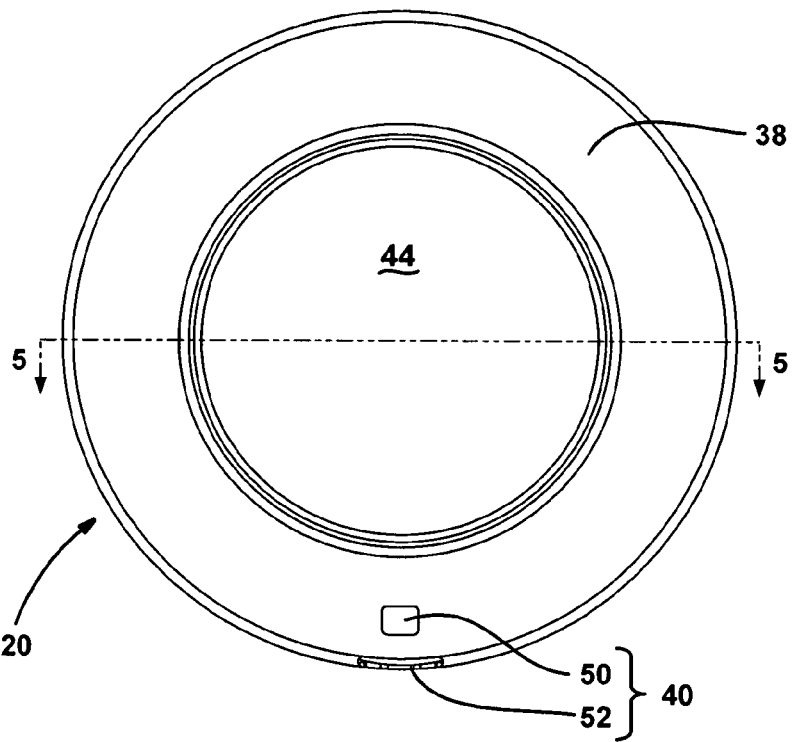
FIG. 4 is a front view of a portion of the actuator assembly of FIG. 1 illustrating the frame in more detail.
Figure 6:
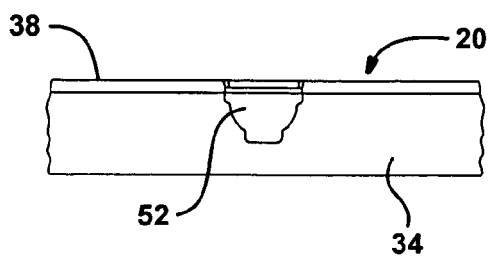
FIG. 6 is a partial side elevation view of the frame.

With reference to FIGS. 4 through 6, the frame 20 can be formed of a suitable material, such as a material having a low magnetic susceptibility (e.g., 316 stainless steel), and can include an outer or first annular sidewall 34, an inner or second annular sidewall 36, an endwall 38 and a sensor mount 40. The endwall 38 can be coupled to the first and second annular sidewalls 34 and 36 so as to define an interior annular recess 42 that is bounded on three sides by the first and second sidewalls 34 and 36 and the endwall 38. The second annular sidewall 36 can define a through-hole 44 and may optionally include a lip portion 46 that extends radially inwardly to somewhat close one side of the through hole 44. The configuration of the sensor mount 40 is tailored to the configuration of the particular sensor assembly 28 employed. In the particular example provided, the sensor mount 40 includes a mounting notch 50, which is formed in the endwall 38 and the first annular sidewall 34, and a mounting aperture 52 that is formed in the endwall 38.

Returning to FIG. 3, the coil assembly 22 can include an outer shell 60, an inner shell 62 and a coil 64. When positioned in the recess 42 of the frame 20, the outer and inner shells 60 and 62 can cooperate to form a core structure 66 that defines an annular coil aperture 68 that is sized to receive the coil 64. The coil assembly 22 can cooperate with the frame 20 to define an armature space 70 in an area that is located radially outward of the coil assembly 22 and inwardly of the first annular sidewall 34.

Figure 8:
FIG. 8 is a sectional view taken along the line 8-8 of FIG. 7.
Figure 7:
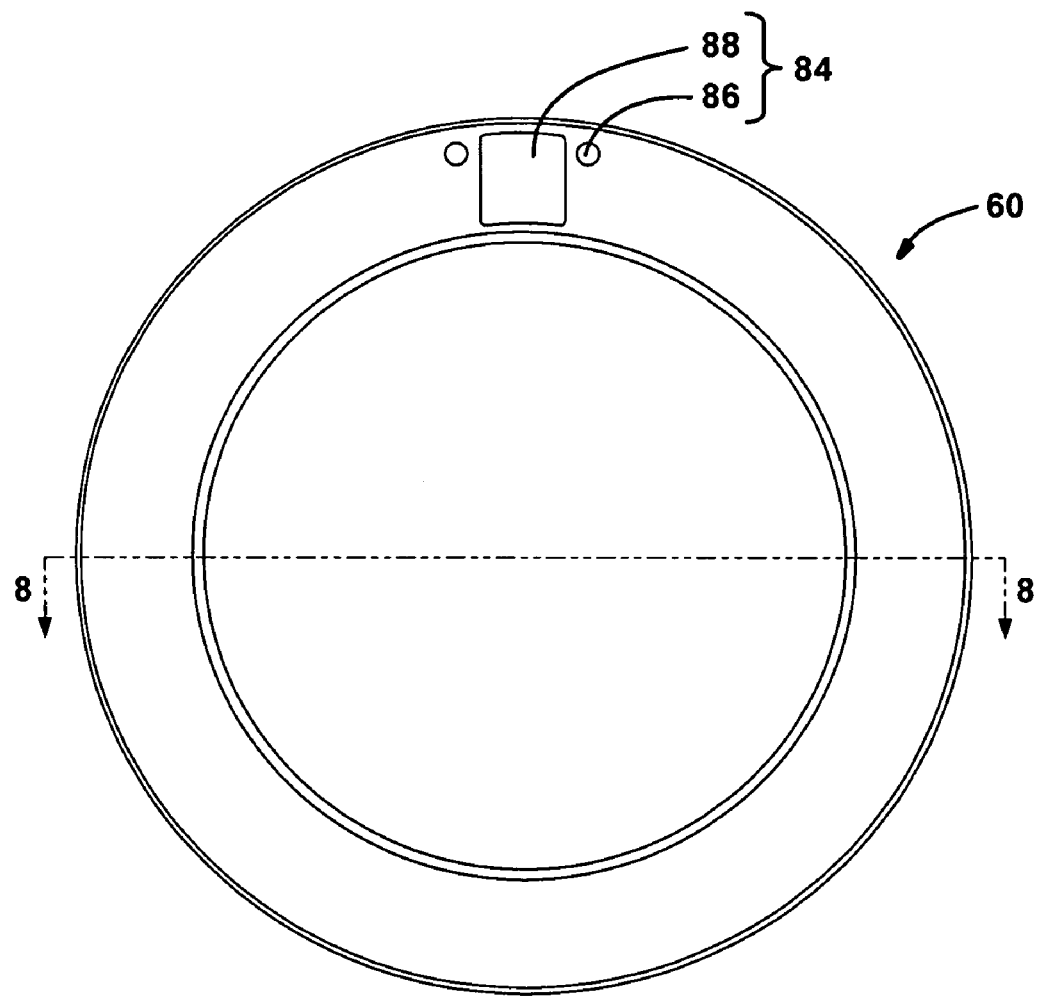
FIG. 7 is a front view of a portion of the actuator assembly of FIG. 1 illustrating the outer shell in more detail.

With additional reference to FIGS. 7 and 8, the outer shell 60 can be formed of a suitable material, such as SAE 1008 steel, and can include an annular body 80 and an annular lip member 82 that can extend radially outwardly from the outer edge of the annular body 80. The annular body 80 can be sized to be received in the annular recess 42 in the frame 20 and can include a coil mount 84 having a pair of threaded apertures 86 and a coupling window 88. The annular lip member 82 can include a chamfered interior edge surface 90. In the example provided, the angle of the chamfer is about 25°.

Figure 9:
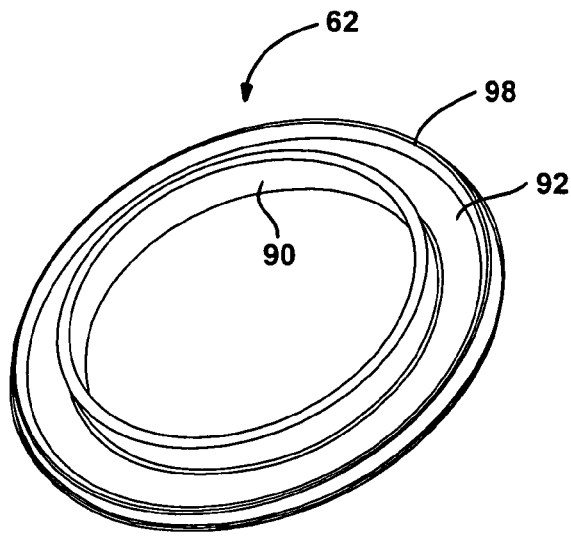
FIG. 9 is a perspective view of a portion of the actuator assembly of FIG. 1 illustrating the inner shell in more detail.
Figure 10:
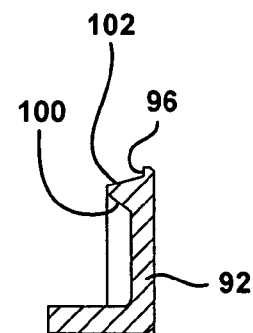
FIG. 10 is a longitudinal section view of the inner shell.
Figure 10:
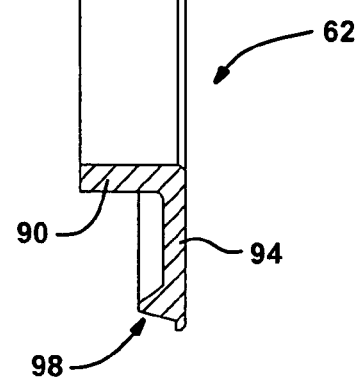

With reference to FIGS. 3, 9 and 10, the inner shell 62 can be formed of a suitable material, such as SAE 1008 steel, and can include a tubular body 90 and a radially projecting wall 92. The tubular body 90 can be sized to be received within the annular recess 42 and abut the second annular sidewall 36. The radially projecting wall 92 can extend radially from an end of the tubular body 90 so as to abut the first annular sidewall 34. The radially projecting wall 92 can include a first flange portion 94, a second flange portion 96 and a circumferentially extending projection 98 that can be formed between the first and second flange portions 94 and 96 proximate a distal end of the radially projecting wall 92. The circumferentially extending projection 98 can be generally V-shaped, having a first tapered face portion 100, which can intersect the first flange portion 94, and a second tapered face portion 102 that can intersect the second flange portion 96. In the particular example provided, the first tapered face portion 100 is disposed at an angle of about 128° from the first flange portion 94 and the second tapered face portion 102 is disposed at an angle of about 74° from the second flange portion 96.

Figure 11:
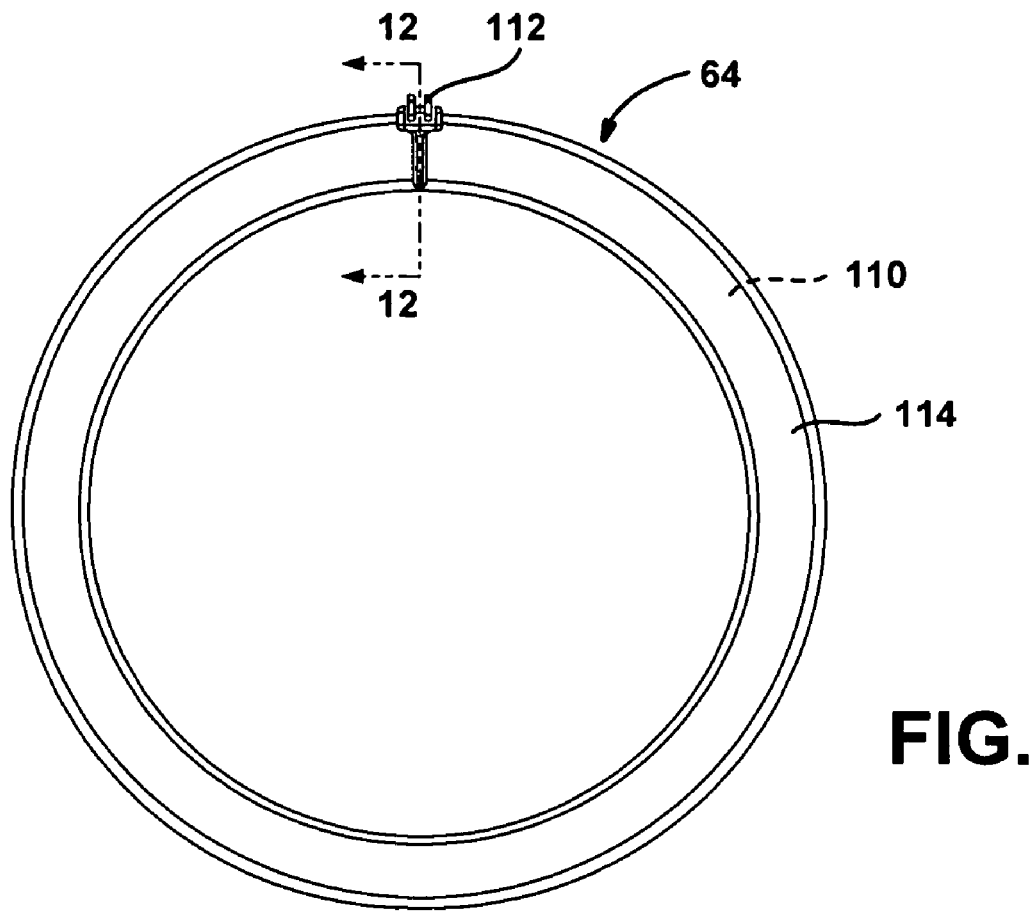
FIG. 11 is a front view of a portion of the actuator assembly of FIG. 1 illustrating the coil in more detail.
Figure 12:
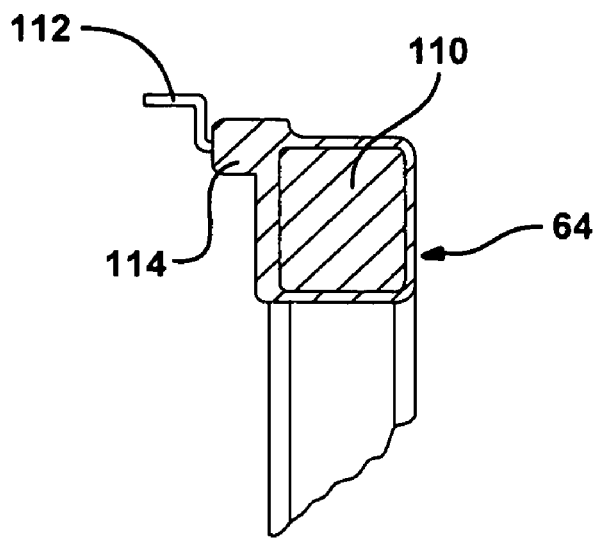
FIG. 12 is a sectional view taken along the line 12-12 of FIG. 11.

In FIGS. 3, 11 and 12, the coil 64 can include a coil winding 110, a pair of terminals 112 and a coil overmold member 114. The coil winding 110 can be formed of an appropriate material, such as 168 turns of POLYBONDEX® (polyester/polyaimdeimide/bondcoat) 21 AWG copper wire having a nominal resistance of about 2.9 ohms. It will be appreciated that the turns of the coil winding 110 can be wound about the longitudinal axis of the coil winding 110 in a conventional and well known manner. The terminals 112 can be formed of a suitable conductor, such as 18 AWG Teflon® coated copper wire and can be employed to electrically couple the coil winding 110 to a source of electrical energy (not shown). The terminals 112 of the coil 64 can be fitted through the coupling window 88 (FIG. 7) in the outer shell 60. The coil winding 110 can be fully or partially encapsulated in the coil overmold member 114 to thereby provide the coil winding 110 with structural integrity that permits the coil 64 to be assembled to the remainder of the actuator assembly 10. The coil overmold member 114 can be formed of an appropriate and well known electrically insulating thermoplastic material, such as ZYTEL® HTN 54615 HSLR marketed by E.I. du Pont de Nemours and Company or EpoxySet EC-1012M Epoxicast with an EH-20M hardener mixed at a rate of 100:10.

Figure 13:
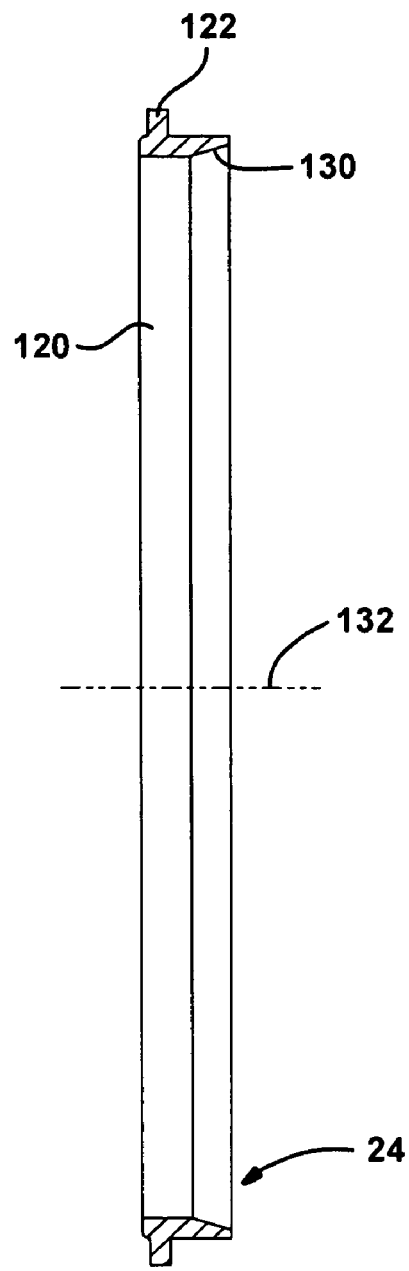
FIG. 13 is a longitudinal sectional view of a portion of the actuator assembly of FIG. 1 illustrating the armature in more detail.
Figure 14:
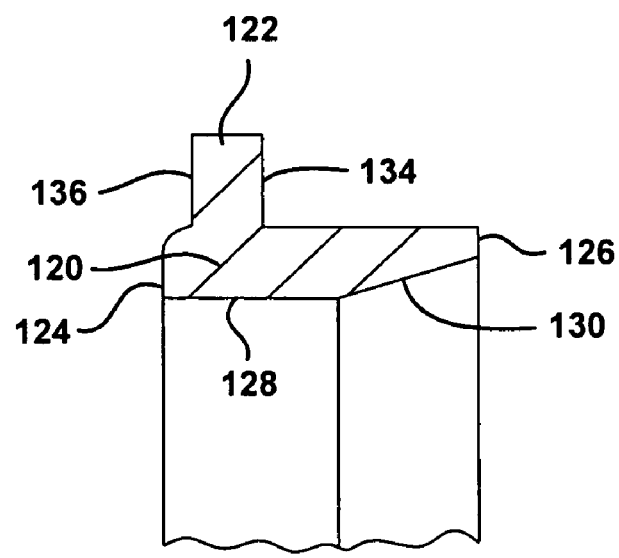
FIG. 14 is an enlarged portion of FIG. 13.

With reference to FIGS. 3, 13 and 14, the armature 24 can be formed of a suitable material, such as a low carbon steel (e.g., SAE 1008 steel), and can include an annular body 120 and a sensor portion 122. The annular body 120 can include a first end 124, a second end 126, an interior surface 128 and a tapered surface 130 that intersects the interior surface 128 and the second end 126. In the example provided, the first and second ends 124 and 126 are generally perpendicular to the longitudinal axis 132 of the armature 24 and the angle between the tapered surface 130 and the longitudinal axis 132 of the armature is about 16°.

The sensor portion 122 can extend radially outwardly from the annular body 120 and can be disposed about the circumference of the annular body 120. The sensor portion 122 can have first and second surfaces 134 and 136, respectively, that can be oriented generally perpendicular to the longitudinal axis 132 of the armature 24. It will be appreciated that the sensor portion 122 need not be formed in a circumferentially extending manner. For example, the sensor portion 122 could be formed as a single tooth that extends radially from the annular body 120 over only a portion of the circumference of the annular body 120. Configuration in this manner would require corresponding changes to the frame 20, the tubular body 120 and/or the plunger 26 to facilitate the "keying" of the armature 24 to the frame 20 and the armature's 24 movement of the plunger 26.

The armature 24 can be disposed in the armature space 70 and can axially translate within the recess 42 in the frame 20. It will be appreciated that the tapered surface 130 of the armature 24 cooperates with the second tapered face portion 102 (FIG. 10) of the inner shell 62 to permit the armature 24 to axially overlap the inner shell 62 without contacting the core structure 66 along this tapered interface. It will also be appreciated that the second end 126 of the armature 24 will contact the second flange portion 96 (FIG. 10) of the inner shell 62 before the tapered surface 130 and the second tapered face portion 102 (FIG. 10) contact one another so that an air gap will always exist between the tapered surface 130 and the second tapered face portion 102 (FIG. 10).

Figure 15:
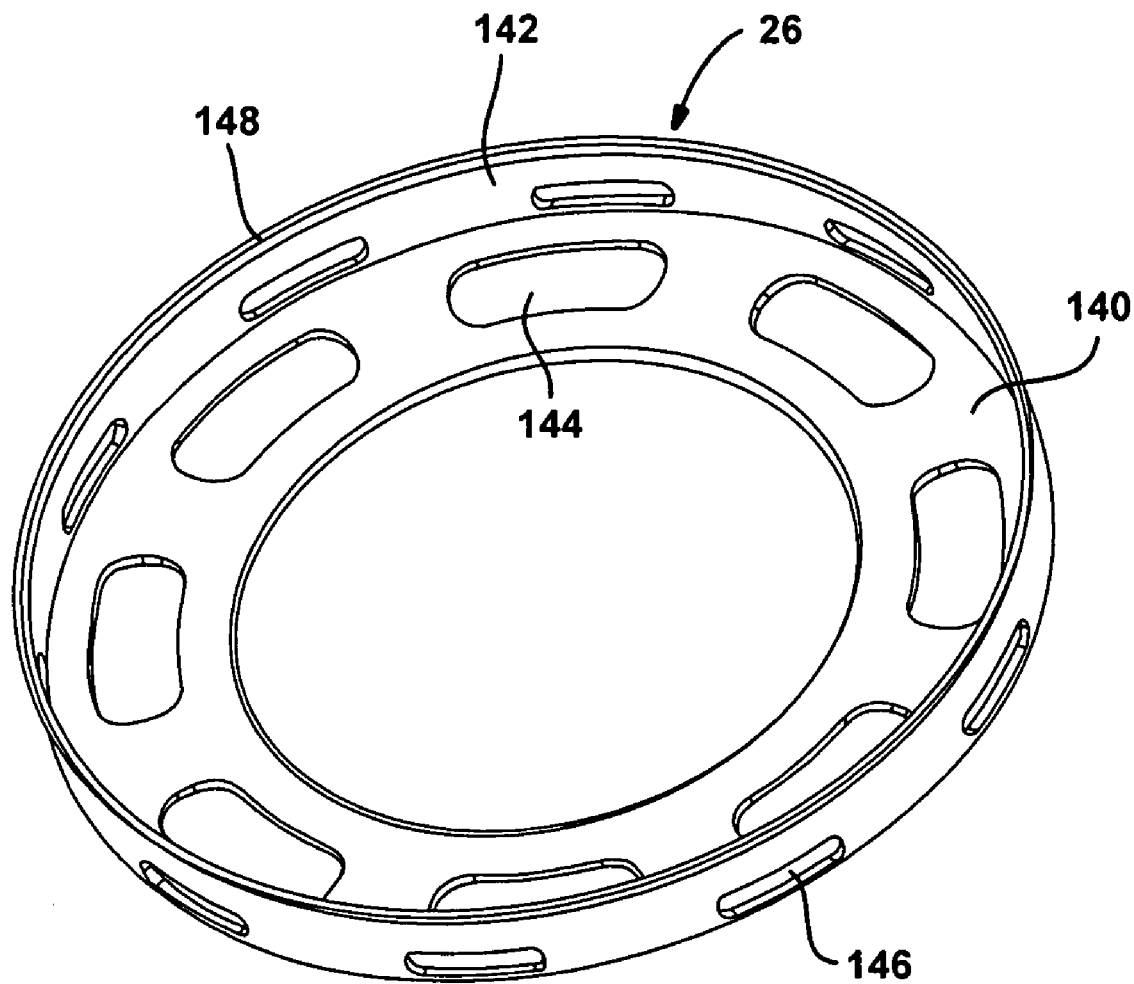
FIG. 15 is a perspective view of a portion of the actuator assembly of FIG. 1 illustrating the plunger in more detail.

In FIGS. 3 and 15, the plunger 26 can be formed of an appropriate material, such as a material having a low magnetic susceptibility (e.g., 316 stainless steel), and can be a cap-like structure having a flange member 140 and a side wall or rim member 142. The flange member 140 can be a ring-shaped plate and can include a plurality of circumferentially spaced-apart apertures 144. The rim member 142 can be coupled to the outer radial edge of the flange member 140 and can extend about the circumference of the flange member 140. A plurality of circumferentially spaced-apart apertures 146 can be formed through the rim member 142. The apertures 144 and 146 can be configured to permit the plunger 26 to more easily translate. For example, the apertures 144 and 146 can reduce the mass of the plunger 26 and as such, it will be appreciated that their quantities, shape and size may be selected based on the parameters of a given application. Such design choices are within the ordinary level of skill in the art and as such, need not be explained in detail herein. The circumference of the rim member 142 can be sized so that the rim member 142 can be received in the recess 42 radially outwardly of the core structure 66 and the flange member 140 can be abutted against the core structure 66 on a side opposite the endwall 38 of the frame 20. A distal end 148 of the rim member 142 can abut a portion of the armature 24, such as the first surface 134 (FIG. 14) of the sensor target 122.

Figure 16:
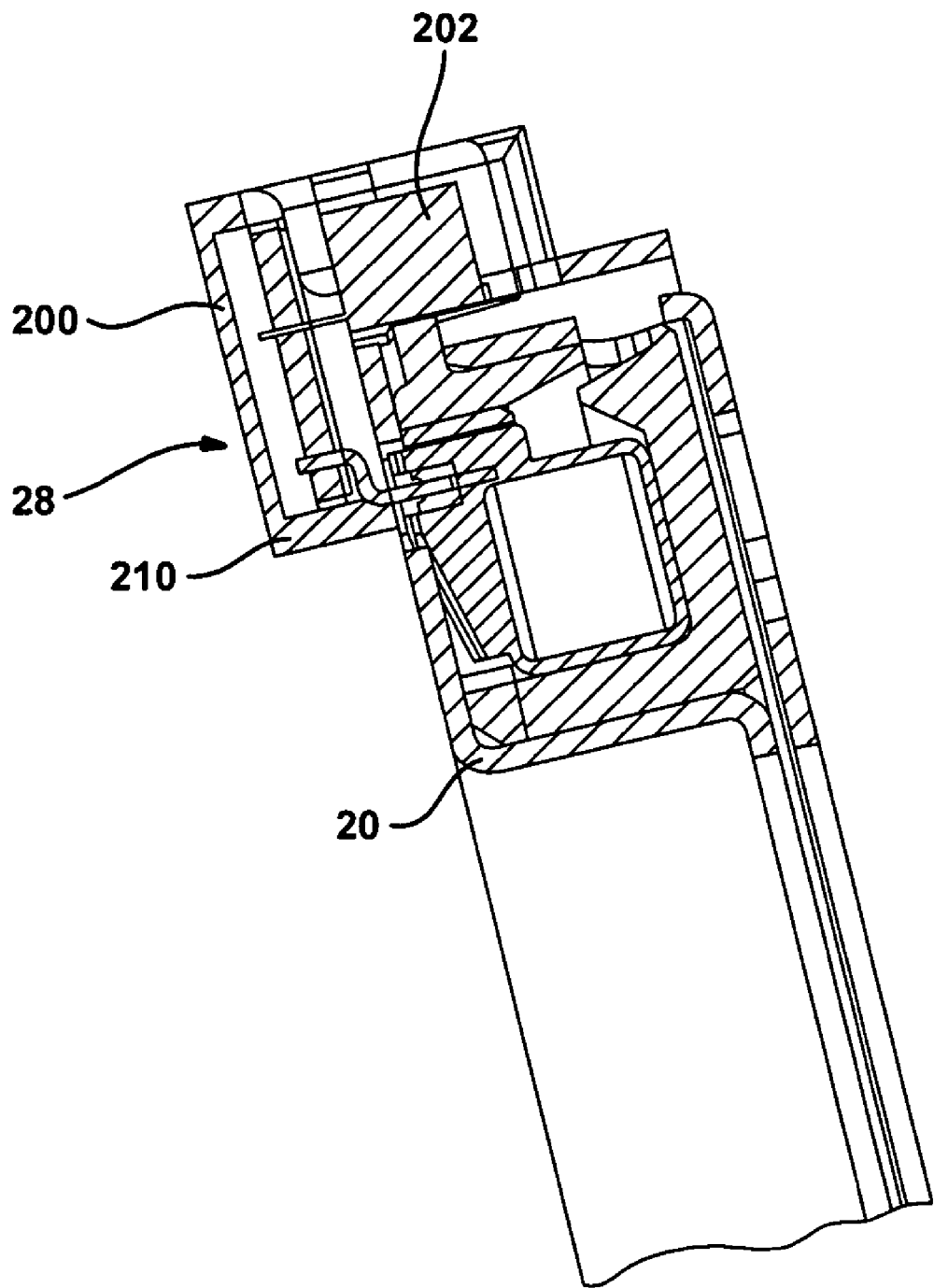
FIG. 16 is a sectional view taken along the line 16-16 of FIG. 1.
Figure 17:
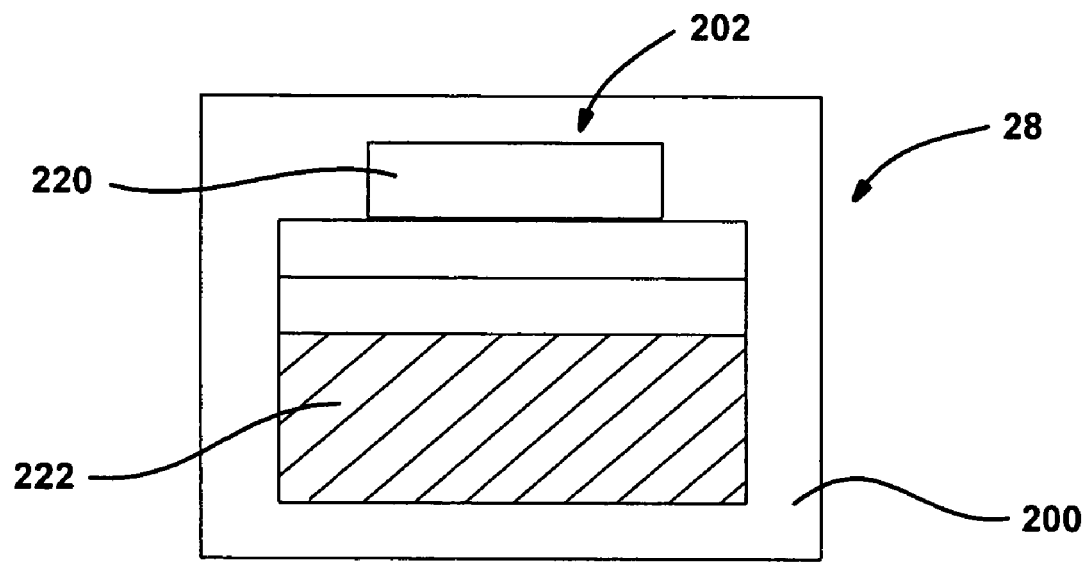
FIG. 17 is a schematic sectional view of a portion of the sensor assembly.

Returning to FIGS. 1 and 2 and with additional reference to FIG. 16 and 17, the sensor assembly 28 can include a back-biased Hall-effect sensor, such as an AT635LSETN-T sensor marketed by Allegro MicroSystems of Worcester Mass. The sensor assembly 28 can include a housing 200 and a sensor portion 202. The housing 200 can be a thermoplastic material that can be overmolded onto the sensor portion 202 and can define a locator 208 (FIG. 2) that can be sized and shaped to matingly engage edges of the mounting aperture 52 (FIG. 4) formed in the endwall 38 and the first annular sidewall 34 of the frame 20. As will be appreciated, the locator(s) on the housing 200 can cooperate with the mounting aperture 52 and other features of the frame 20 to position the sensor assembly 28 in a predetermined location relative to the sensor target 122 (FIG. 3). The sensor assembly 28 can be coupled to the frame 20 in any appropriate manner, such as epoxy bonding or overmolding. Such techniques are well known in the art and as such, need not be discussed in detail herein. In the particular example provided, an overmold 210 is applied to the sensor portion 202 to fixedly couple the sensor portion 202 to the frame 20.

With reference to FIG. 17, the sensor portion 202 can include a circuit 220 and a magnet 222. As will be appreciated, the magnet 222 is operable for producing a magnetic field and the circuit 220 can include a Hall-effect circuit that can be operable for sensing the magnetic field. Positioning of the sensor target 122 (FIG. 3) within the magnetic field can alter the field lines of the magnetic field and these alterations can be sensed by the circuit 220. Accordingly, the circuit 220 can produce a sensor signal that is responsive to a position of the sensor target 122 (FIG. 3). In the example provided, the circuit 220 can switch on and off in response to the position of the sensor target 122 (FIG. 3) relative to the sensor portion 202. The circuit 220 can be a digital, programmable, truepower-on Hall-effect circuit. In this regard, the circuit 220 can provide a first digital switch output (e.g., a low logic level) when the sensor target 122 (FIG. 3) is in a first position and the circuit 220 is in a first state (e.g., corresponding to a high logic level) and a second digital switch output (e.g., a high logic level) when the sensor target 122 (FIG. 3) is in a second position and the circuit 220 is in a second state (e.g., corresponding to low logic level).

Figure 18:
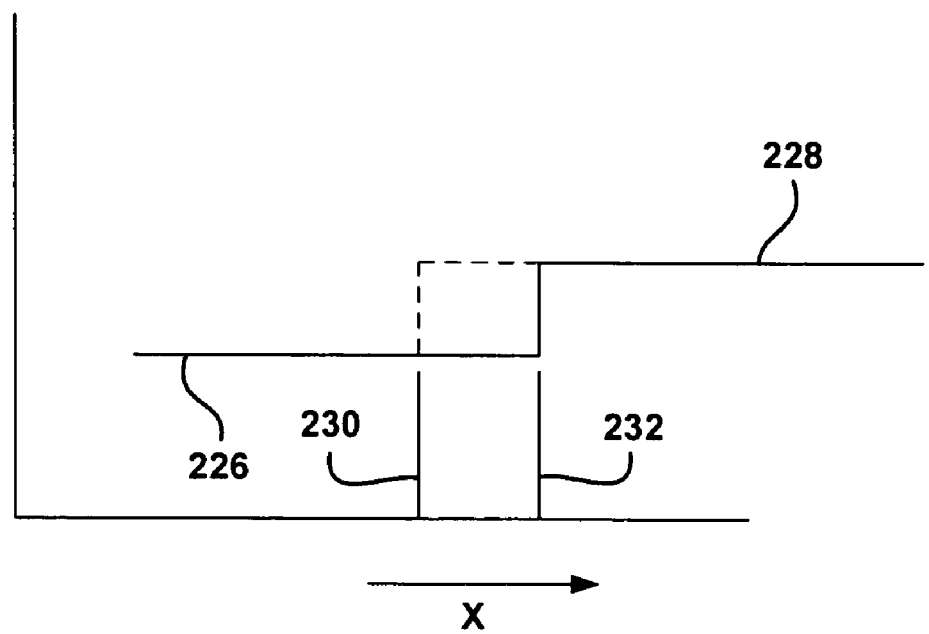
FIG. 18 is a plot illustrating the output of the sensor signal produced by the sensor assembly as a function of the relative position of the sensor target.

The output of the circuit 220 is schematically illustrated in FIG. 18. With additional reference to FIGS. 3 and 17, movement of the sensor target 122 in the direction X when the state condition of the circuit 220 is low does not effect the state condition of the circuit 220 when the sensor target is in-line with the second position 230 and consequently, the circuit 220 continues to output the first digital switch output. Continued movement of the sensor target in the direction X positions the sensor target at the first position 232, which causes the circuit 220 to switch to from a low logic state 226 to a high logic state 228 and the circuit 220 responsively produces the second digital switch output. Thereafter, the sensor target can move further in the direction X or can move toward the second position 230 (but not in-line with the second position 230) without affecting the output of the circuit 220.

When the circuit 220 is in the high logic state and the sensor target is moved in-line with the second position 230, the circuit 220 will switch from the high logic state 228 to the low logic state 226 and the circuit 220 responsively produces the first digital switch output. Thereafter, the sensor target 122 can move further in a direction opposite the direction X or can move toward the first position 232 (but not in-line with the first position 232) without affecting the output of the circuit 220.

Figure 19:
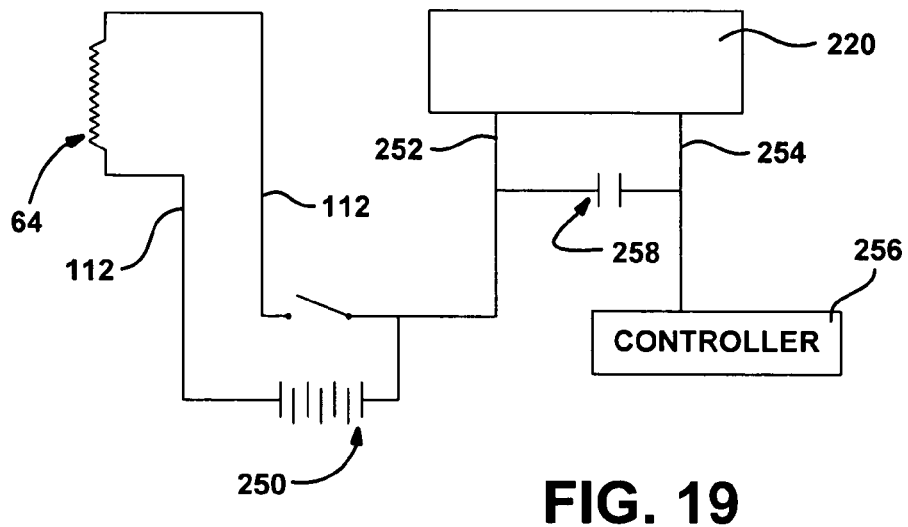
FIG. 19 is a schematic illustration of the coil assembly and sensor assembly as coupled to a power source and a controller.

With reference to FIG. 19, it will be appreciated that the terminals 112 of the coil 64 can be selectively coupled to a source of electrical power, such as a battery 250. The circuit 220 can include an input terminal 252, which is configured to receive an electrical input of a predetermined voltage, and an output terminal 254 that is configured to transmit the first and second digital switch outputs to a controller 256. A capacitor 258 can be electrically coupled to the input terminal 252 and the output terminal 254 to attenuate electrical noise.

With additional reference to FIG. 3, electrical power can be applied to the coil 64 to actuate the actuator assembly 10, wherein a magnetic field produced by the coil 64 will drive the armature 24 in an actuating direction (i.e., a direction opposite the endwall 38 of the frame 20). As the distal end 148 of the rim member 142 of the plunger 26 is abutted against the first surface 134 of the sensor target 122, translation of the armature 24 in the actuating direction will cause corresponding translation of the plunger 26.

Figure 20:
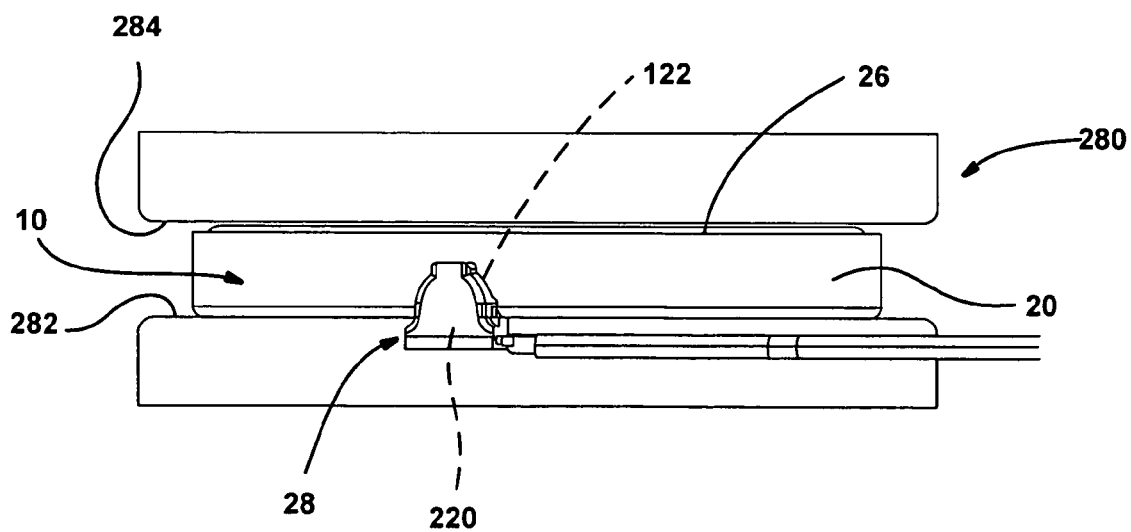
FIG. 20 is an elevation view illustrating the calibration of the sensor assembly after the actuator assembly of FIG. 1 has been assembled.

As the circuit 220 of the sensor assembly 28 is programmable in the example provided, the actuator assembly 10 can be positioned in a setting jig or fixture 280 as shown in FIG. 20 between a datum surface 282 and a gauging surface 284 that is spaced apart from the datum surface 282 by a predetermined distance. The actuator assembly 10 can be actuated so that the plunger 26 is extended sufficiently such that a non-moving portion of the actuator assembly 10 (e.g., the frame 20) is abutted against one of the datum surface 282 and the gauging surface 284 while the plunger 26 is abutted against the other one of the datum surface 282 and the gauging surface 284. It will be appreciated that the sensor target 122 will be positioned in a predetermined position (e.g., the first position) and as such, the circuit 220 may be programmed to identify this condition. In the example provided, the circuit 220 is configured such that the setting of one position (e.g., the first position) will automatically set or establish the other position (e.g., the second position).

In view of the above, it will be appreciated that the actuator assembly 10 may be pre-programmed and thereafter assembled to a driveline component, such as a locking differential or a transfer case, without further programming or calibration in certain applications. The pre-programming of the sensor assembly 28 is particularly advantageous in that it permits the programming to be performed prior to the installation of the actuator assembly 10 to the driveline component in an environment where the programming may be performed in a relatively more efficient manner with relatively simple and inexpensive tooling (i.e., tooling that is not based on the configuration of the driveline component). Moreover, pre-programming of the actuator assembly 10 eliminates the need for further programming and/or calibration should the actuator assembly 10 be replaced when the driveline component is serviced.

Figure 20A:
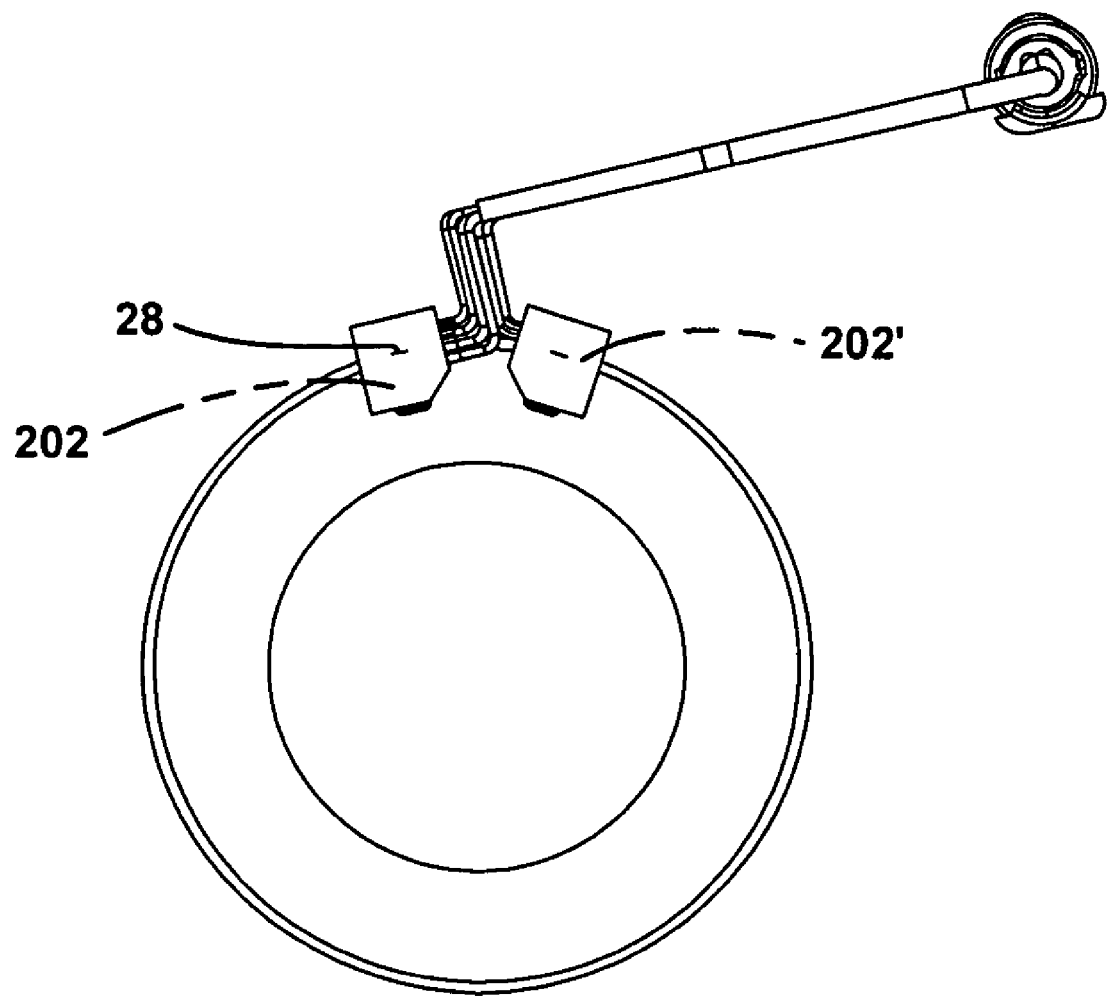
FIG. 20A is a front view of another actuator assembly constructed in accordance with the teachings of the present disclosure, the actuator including a sensor assembly having redundant sensor portions.

While the sensor assembly 28 and the sensor portion 202 have been illustrated and described herein as including a back-biased Hall-effect sensor, those of ordinary skill in the art will appreciate that any appropriate type of sensor may be employed in the alternative. For example, the sensor assembly 28 and the sensor portion 202 could include a magnetoresistive sensor or a magnetostrictive sensor, such as a magnetoresistive or magnetostrictive Hall-effect sensor, as such sensors can be somewhat less influenced by a change in the magnitude of the magnetic field proximate the sensor assembly 28. It will also be appreciated that the sensor assembly 28 can include a second sensor portion 202' as shown in FIG. 20A. The dual sensor portions 202, 202' provide a level of redundancy that may be desirable in some situations.

Figure 21:
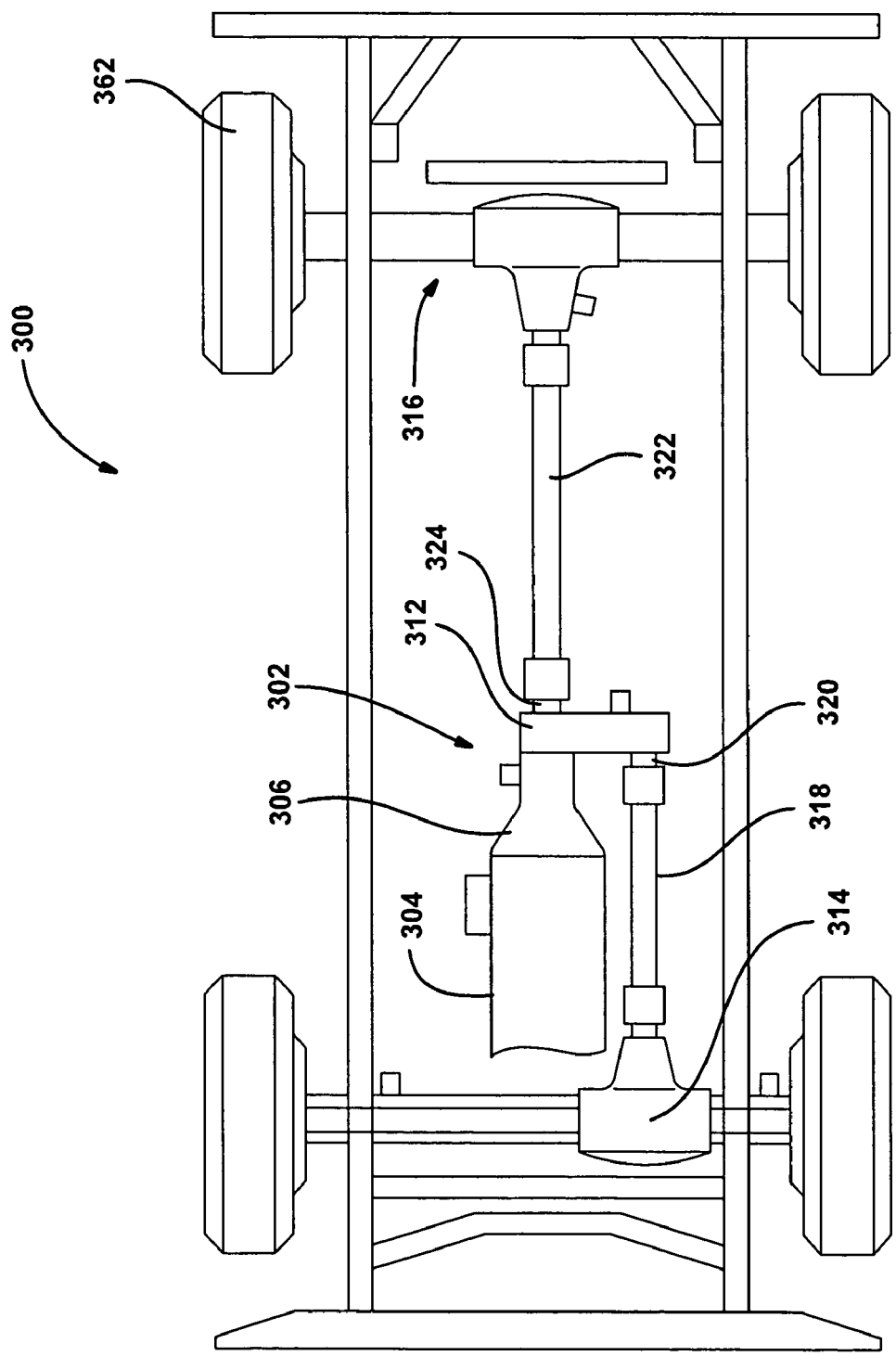
FIG. 21 is a schematic illustration of a vehicle having a driveline constructed in accordance with the teachings of the present disclosure.

With reference to FIG. 21, a motor vehicle 300 is illustrated to include a drive train 302 that incorporates an actuator assembly constructed in accordance with the teachings of the present disclosure. The motor vehicle 302 can include a power source 304, such as an internal combustion engine, and a transmission 306 that can provide rotary power to the drive train 302 in a manner that is well known in the art. In the example provided, the drive train 302 includes a transfer case 312, a first or front axle assembly 314, a second or rear axle assembly 316, a first propeller shaft 318, which conventionally couples the front axle assembly 314 to a front output shaft 320 of the transfer case 312, and a second propeller shaft 322 that conventionally couples the rear axle assembly 316 to a rear output shaft 324 of the transfer case 312. The transfer case 312 can receive rotary power from the transmission 306 and can distribute rotary power to the front and rear axle assemblies 314 and 316 in a desired manner.

The front and rear axle assemblies 314 and 316 can be similar in their construction and operation and as such, only the rear axle assembly 316 will be discussed in detail herein. With additional reference to FIG. 22, the rear axle assembly 316 can include an axle housing 350, a differential assembly 352 and a pair of axle shafts 354 (only one of which is specifically shown). The axle housing 350 can be conventionally configured and can include a housing structure 360 and a pair of bearing caps 362 that can be fixedly but removably coupled to the housing structure 360. The housing structure 360 can define a differential cavity 364 that houses the differential assembly 352. The bearing caps 362 can be decoupled from the housing structure 360 to permit the differential assembly 352 to be received within the differential cavity 364. The axle shafts 354 can be coupled to opposite sides of the differential assembly 352 and to respective ones of the rear vehicle wheels 362 (FIG. 21) in any appropriate manner.

Figure 22:
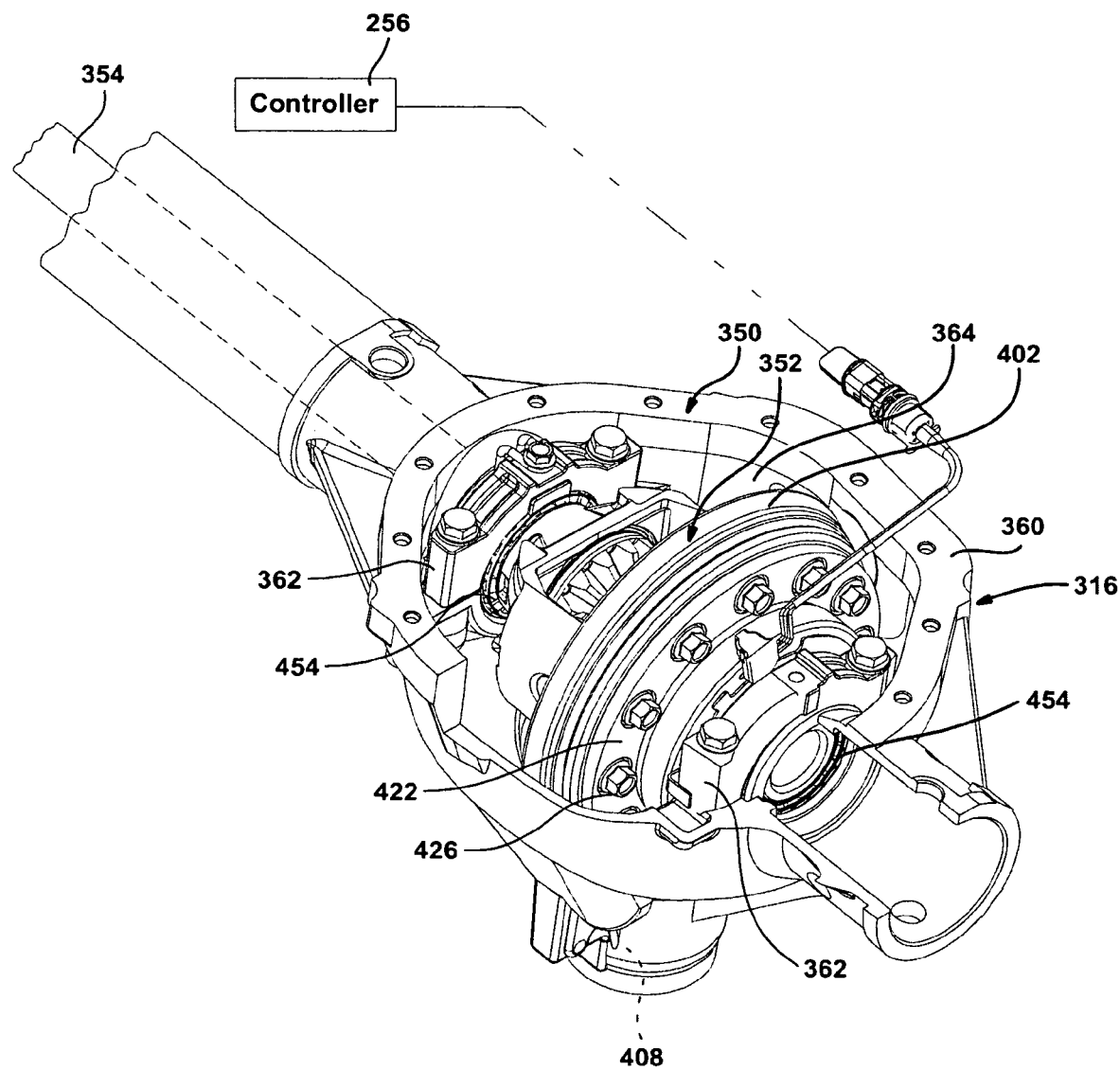
FIG. 22 is a partially broken away perspective view of a portion of the vehicle of FIG. 21, illustrating the rear axle assembly in more detail.
Figure 23:
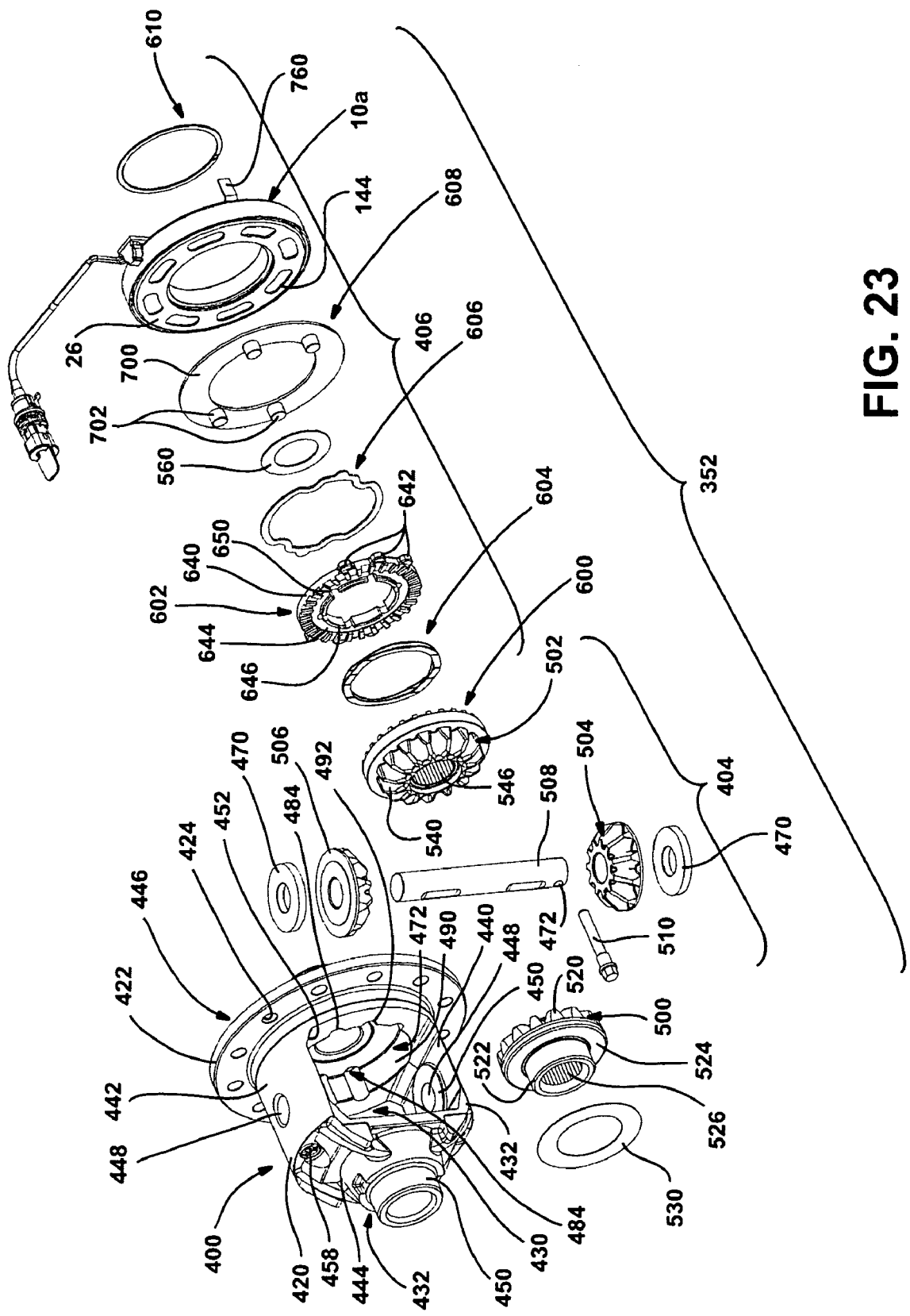
FIG. 23 is an exploded perspective view of a portion of the rear axle assembly, illustrating the differential assembly in more detail.
Figure 24:
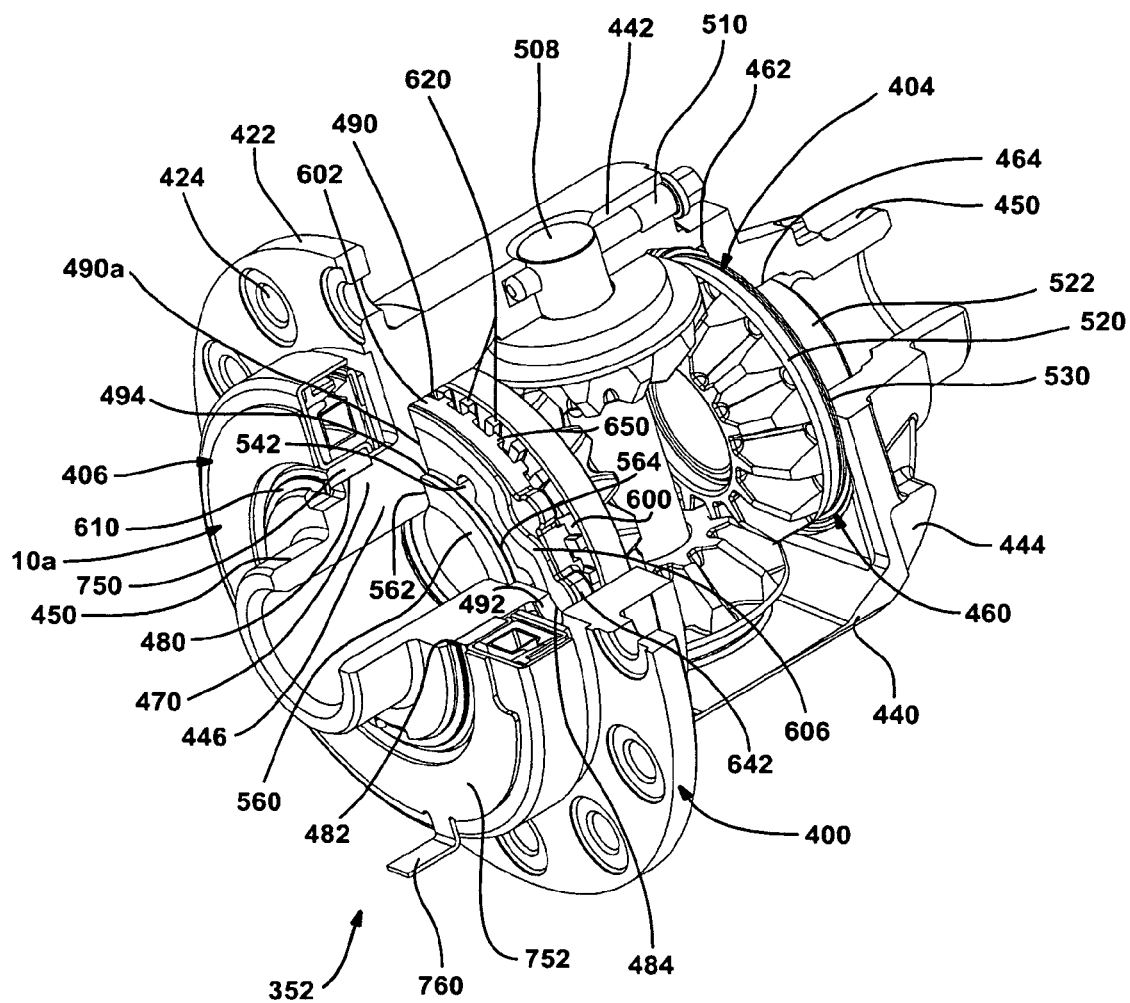
FIG. 24 is a partially broken away perspective view of the differential assembly.

With additional reference to FIGS. 23 and 24, the differential assembly 352 can include a differential case 400, a ring gear 402 (FIG. 22), a gear set 404, a locking system 406 and an input pinion 408 (FIG. 22). The input pinion 408 and the ring gear 402 can be conventionally constructed and mounted in the axle housing 350 and as such, need not be discussed in significant detail herein. Briefly, the input pinion 408 can be coupled to the axle housing 350 via a set of bearings (not specifically shown) and disposed about a rotational axis that is generally perpendicular to a rotational axis of the differential case 400. The input pinion 408 can include a plurality of pinion teeth (not shown) that can be meshingly engaged to a plurality of ring gear teeth (not specifically shown) formed on the ring gear 402.

The differential case 400 can include a body portion 420 and a circumferentially-extending flange 422 that is coupled to (e.g., integrally formed with) the body portion 420. The flange 422 can include a plurality of apertures 424 that can facilitate the removable coupling of the ring gear 402 via a plurality of threaded fasteners 426.

The body portion 420 can define a gear set cavity 430 and one or more assembly windows 432, which can be employed to install the gear set 404 into the gear set cavity 430. In the example provided, the body portion 420 includes first and second side segments 440 and 442, respectively, and first and second end segments 444 and 446, respectively. Each of the first and second side segments 440 and 442 can include a through-bore 448, which can be arranged generally perpendicular to the rotational axis of the differential case 400, and a boss 450 that can be disposed concentrically about the through-bore 448 within the gear set cavity 430. A relatively large fillet radius 452 can be employed at the intersection between the second end segments and the first and second side segments 440 and 442.

Each of the first and second end segments 444 and 446 can span between the first and second side segments 440 and 442 and can include a hollow, axially extending trunnion 450. Each trunnion 450 can define an inside diameter, which can be sized to receive a corresponding one of the axle shafts 354 there through, and an outside diameter that can be sized to engage a bearing 454 (FIG. 22) that is disposed between the housing structure 360 and the bearing cap 362. Those of ordinary skill in the art will appreciate that the differential case 400 may be may be mounted to the axle housing 350 via the bearings 454 for rotation within the differential cavity 364 about the aforementioned rotational axis.

A retaining bore 458 can be formed through the first end segment 444 and a portion of the second side segment 442 and can intersect the through-bore 448. A first annular pocket 460 can be formed in the interior face of the first end segment 444 and can be concentric with the trunnion 450. The first annular pocket 460 can include a first bore portion 462 and a second bore portion 464 that can be concentric with and relatively smaller in diameter than the first bore portion 462.

The second end segment 446 can include an outer portion that defines a mounting hub 470 and an interior portion that defines a second annular pocket 472. The mounting hub 470 can be disposed between the flange 422 and the trunnion 450 and can include an actuator mount surface 480 that can be generally concentric with the trunnion 450. A circumferentially extending groove 482 can be formed in the actuator mount surface 480. A plurality of actuator apertures 484 can be formed axially through the second end segment 446 and can intersect the second annular pocket 472. The second annular pocket 472 can include a pocket portion 490, a plurality of locking features 492 and a thrust ring pocket 494. In the example provided, the pocket portion 490 is generally circular in shape and the locking features 492 can be recesses that can intersect the pocket portion 490. The locking features 492 can be shaped in any appropriate manner and in the example provided, have a half-circle shape that extends from the pocket portion 490. The thrust ring pocket 494 can be circular in shape and concentric with the pocket portion 490.

The gear set 404 can include first and second side gears 500 and 502, respectively, first and second pinion gears 504 and 506, respectively, a cross-shaft 508 and a retaining bolt 510. The first side gear 500 can include an annular gear portion 520, which can have a plurality of gear teeth, an annular hub portion 522, which can intersect the gear portion 520 at a flange face 524, and a splined aperture 526 that can engage a mating splined segment (not shown) formed on a corresponding one of the axle shafts 354. The hub portion 522 can be sized to be received in the second bore portion 464 in the first end segment 444, while a portion of the gear portion 520 can be received in the first bore portion 462. In the particular example provided, a thrust washer 530 is disposed over the hub portion 522 and abuts the flange face 524.

The second side gear 502 can include a gear portion 540, which can have a plurality of gear teeth, a tubular hub portion 542 and a splined aperture 546. The tubular hub portion 542 can axially extend from the second side gear 502 in a direction opposite the gear portion 540. The splined aperture 546 can be formed through the tubular hub portion 542 and can engage a mating splined segment (not shown) formed on a corresponding one of the axle shafts 354. The second side gear 502 can be received in the first pocket portion 490 of the second end segment 446. A thrust washer 560 can be disposed in the thrust ring pocket 494 between the interior surface 562 of the second end segment 446 and an axial end face 564 of the tubular hub portion 542. It will be appreciated that the thickness of the thrust washer 560 can be selected to control the lash between the teeth of the second side gear 502 and the teeth of the first and second pinion gears 504 and 506.

The first and second pinion gears 504 and 506 can be rotatably mounted on the cross-shaft 508 and meshingly engaged to the teeth of the first and second side gears 500 and 502. The cross-shaft 508 can extend through the through-bores 448 in the first and second side segments 440 and 442. Washer-like spacers 470 can be employed to control the lash between the first and second pinion gears 504 and 506 and the first and second side gears 500 and 502. The retaining bolt 510 can be inserted into the retaining bore 458 and threadably engaged to a mating threaded aperture 472 formed in the cross-shaft 508 to thereby fixedly secure cross-shaft 508 to the differential case 400.

The locking system 406 can include a first dog ring 600, a second dog ring 602, a return spring 604, a spacer ring 606, a thrust plate 608, an actuator assembly 10a and a retaining ring 610.

Figure 25:
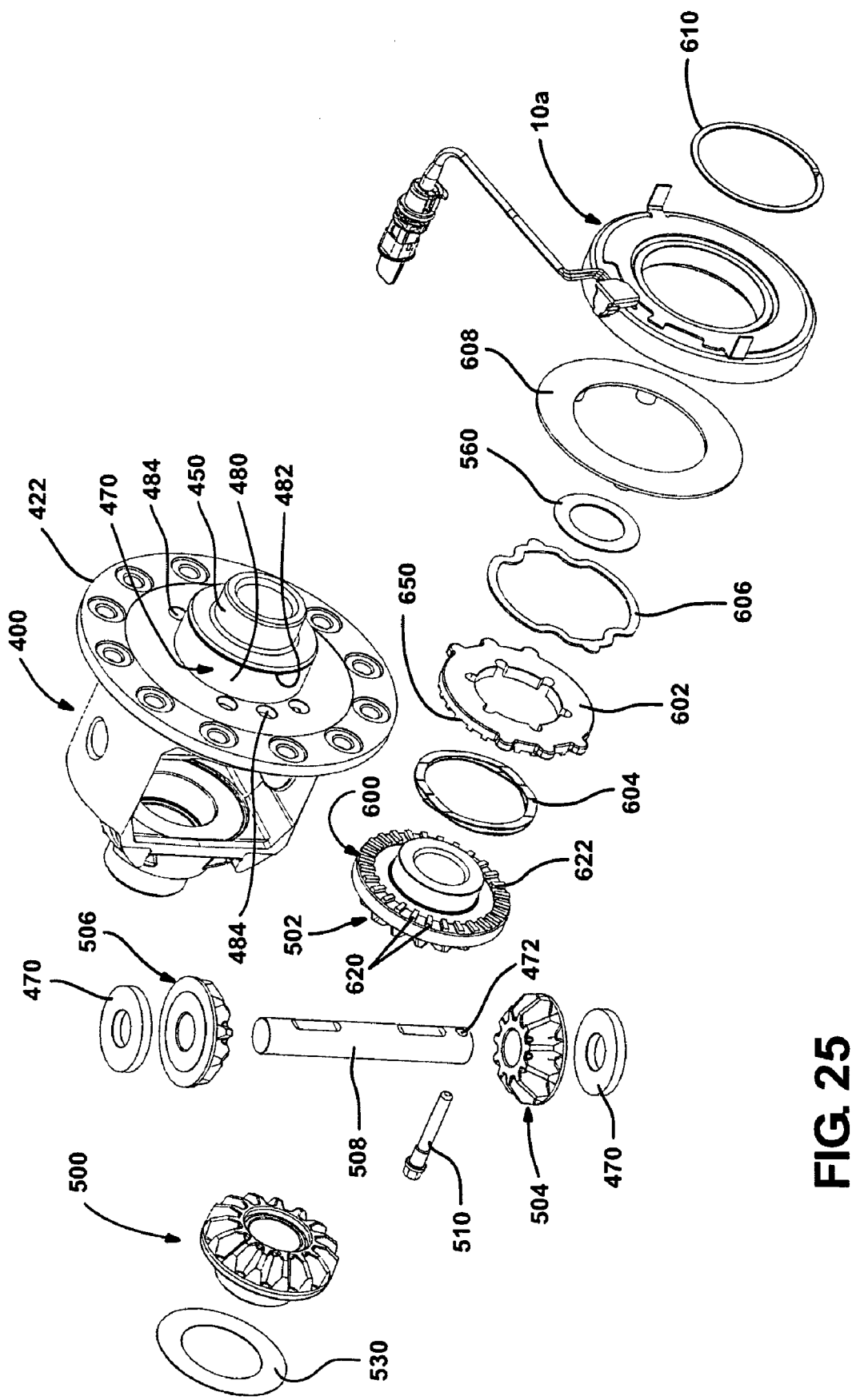
FIG. 25 is an exploded perspective view of a portion of the rear axle assembly, illustrating the differential assembly in more detail.

With reference to FIGS. 23 through 25, the first dog ring 600 can be coupled (e.g., integrally formed) with the second side gear 502 on a portion thereof opposite the gear portion 540. The first dog ring 600 can include a plurality of circumferentially spaced apart radially extending teeth 620 and a circular groove 622 that can be disposed between the tubular hub portion 542 and the teeth 620. In the example provided, the teeth 620 are relatively numerous and shallow so as to provide increased strength and load sharing between the teeth 620 as well as to lower tooth contact stresses.

The second dog ring 602 can include an annular body portion 640, a plurality of mating locking features 642, a circular groove 644 and a pilot portion 646. The annular body portion 640 can be received in the pocket portion 490 of the second annular pocket 472 and can include a plurality of teeth 650 that are configured to matingly engage the teeth 620 of the first dog ring 600. The circular groove 644 can be disposed radially inwardly of the teeth 650 and can generally correspond to the circular groove 482 formed in the first dog ring 600. The pilot portion 646 can be an annular axially projecting rim that can aid in retaining the return spring 604 to the second dog ring 602. Additionally or alternatively, the pilot portion 646 can engage a mating feature formed on the first dog ring 600 or the second side gear 502 that can guide or aid in guiding the teeth 650 of the second dog ring 602 into engagement with the teeth 620 of the first dog ring 600. The mating locking features 642 can be coupled to the annular body portion 640 and in the example provided, comprise tabs that are semi-circular in shape. The mating locking features 642 are configured to engage the locking features 492 in the second annular pocket 472 to permit the second dog ring 602 to be non-rotatably coupled to the differential case 400 but axially movable relative to the differential case 400 along the rotational axis of the differential case 400.

The spacer ring 606 can be disposed within the pocket portion 490 about the locking features 492 and can be positioned axially between the second dog ring 602 and the surface 490a of the pocket portion 490. The return spring 604 can be any appropriate spring and can bias the first and second dog rings 600 and 602 apart from one another. In the example provided, the return spring 604 is a double wave spring that can be disposed in the circular grooves 622 and 644. It will be appreciated that the return spring 604 can bias the second dog ring 602 into abutment with the spacer ring 606 and the spacer ring 606 into abutment with the second end segment 446.

The thrust plate 608 can include a plate portion 700 and a plurality of leg members 702. The plate portion 700 can have an annular shape and can be sized so as to be slidably received over the actuator mount surface 480. The leg members 702 can be coupled to the plate portion 700 and can extend axially through the actuator apertures 484 formed in the second end segment 446. The end of the leg members 702 opposite the plate portion 700 can engage the second dog ring 602 in an appropriate area. In the example provided, the thrust plate 608 include four leg members 702 each of which abutting a corresponding one of the mating locking features 642.

Figure 26:
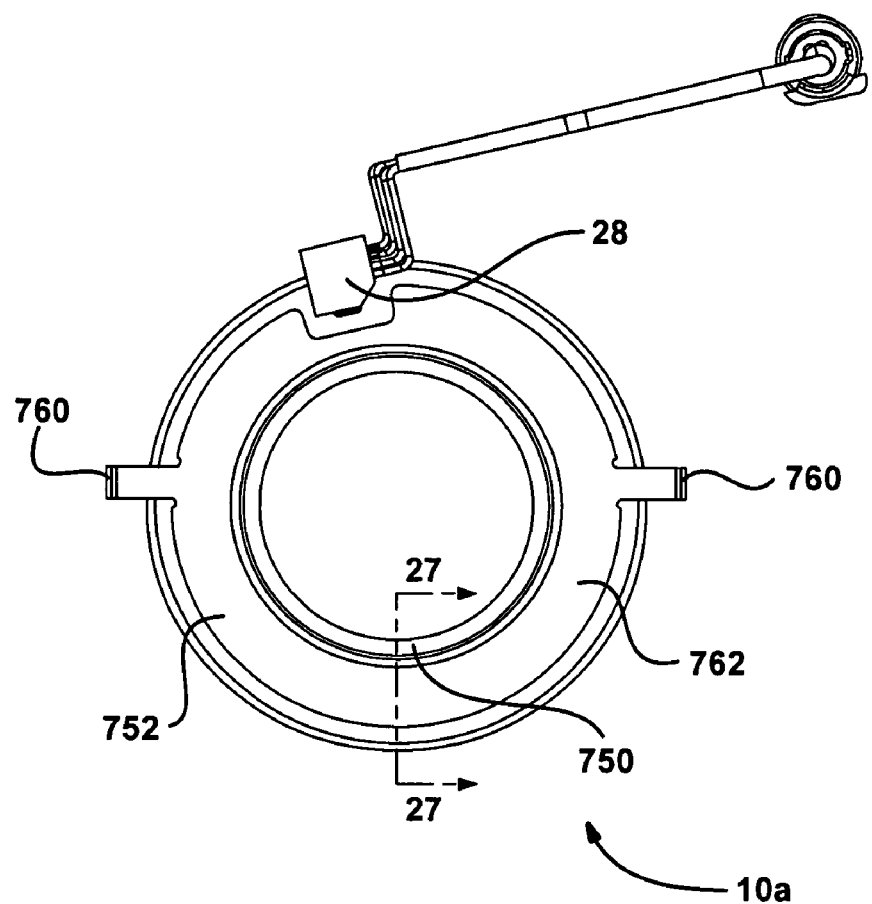
FIG. 26 is a front view of another actuator assembly constructed in accordance with the teachings of the present disclosure.
Figure 28:
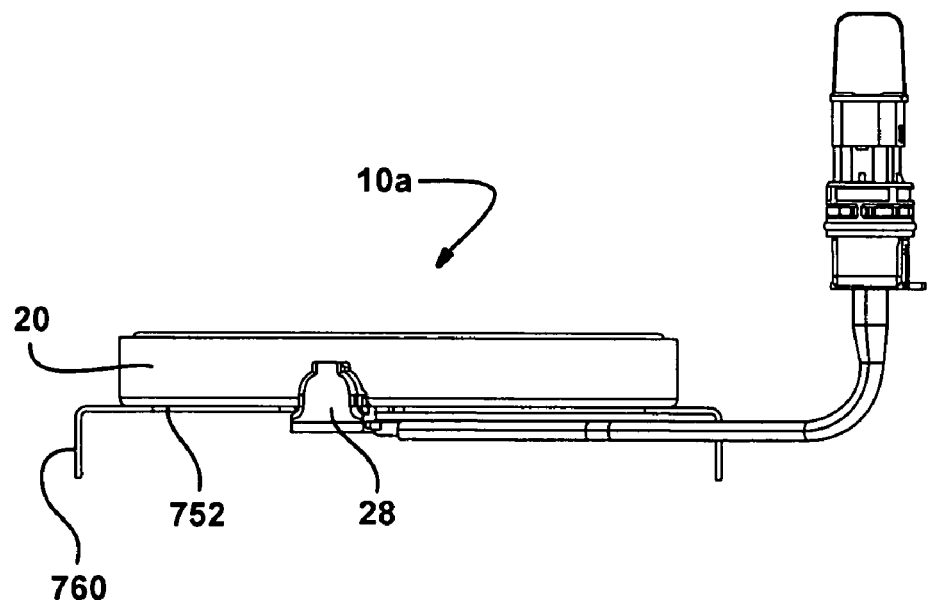
FIG. 28 is a side elevation of the actuator assembly of FIG. 26.
Figure 27:
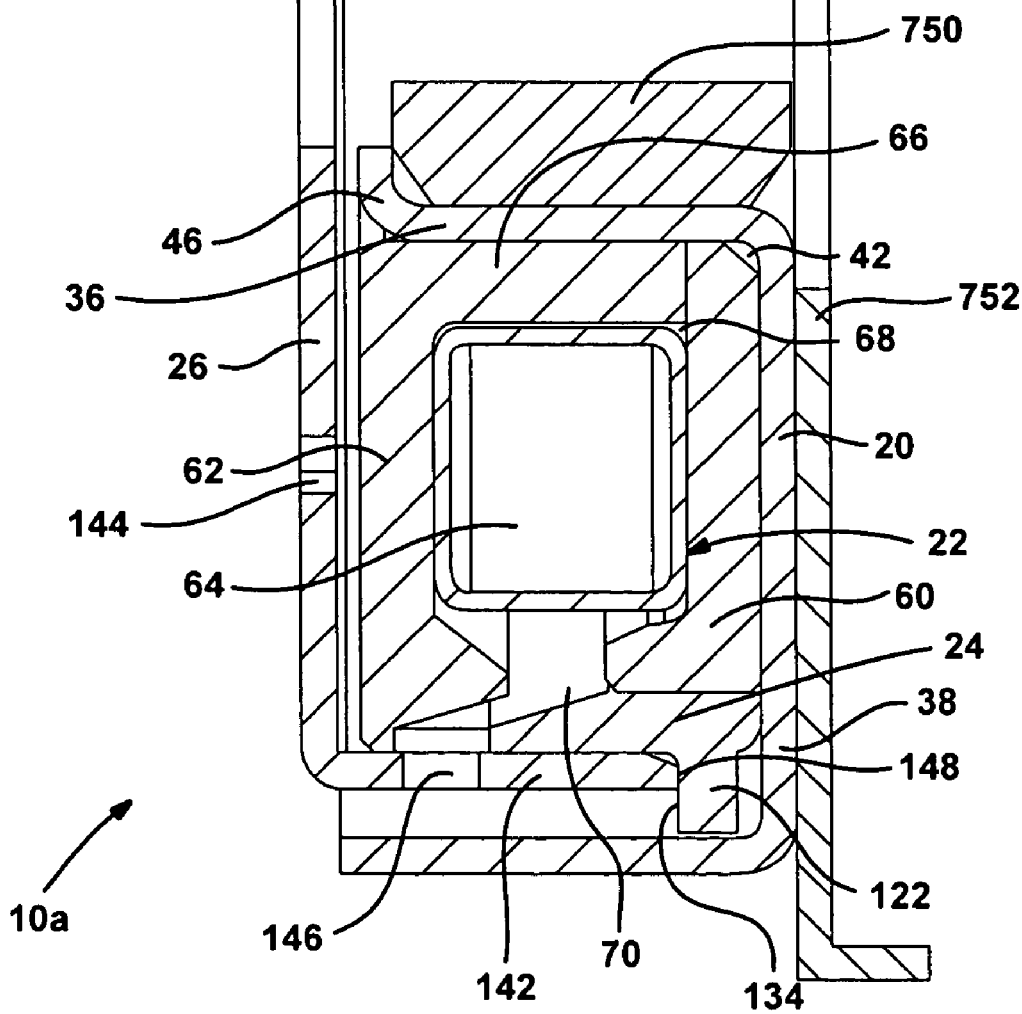
FIG. 27 is a sectional view taken along the line 27-27 of FIG. 26.

The actuator assembly 10a can be generally similar to the actuator assembly 10 described above in conjunction with FIGS. 1 through 19, except that the actuator assembly 10a includes a bushing 750 and an anti-rotate bracket 752. With reference to FIGS. 26 and 27, the bushing 750 can be formed of an appropriate material, such as an oil-impregnated sintered bronze conforming to ASTM B438. The bushing 750 can have an outer diameter, which can be sized to engage the second annular sidewall 36 via an interference fit. The bushing 750 can be pressed into the annular recess 42 such that an end of the bushing 750 abuts the annular lip 46. The bushing 750 can define an inner diameter that is sized to be journally supported on the actuator mount surface 480 (FIG. 24) of the mounting hub 470 (FIG. 24) of the differential case 400 (FIG. 24).

The anti-rotate bracket 752 can be formed of an appropriate material, such as a material having a low magnetic susceptibility (e.g., 316 stainless steel), and can include one or more tab members 760 that can be coupled to the frame 20. In the particular example provided, the anti-rotate bracket 752 is a discrete structure that includes an annular body portion 762 that can be coupled to the frame member 20 by an appropriate coupling means, such as fasteners (e.g., threaded fasteners, rivets), welds or adhesives. The tab members 760 can extend generally perpendicular to the annular body portion 762 and are configured to engage the opposite lateral surfaces of an associated one of the bearing caps 362 (FIG. 22) so as to inhibit relative rotation between the axle housing 350 (FIG. 22) and the actuator assembly 10a. It will be appreciated, however, that the tab members 760 could be integrally formed with the frame 20 in the alternative.

Returning to FIGS. 23 and 24, the actuator assembly 10a can be slidably received onto the mounting hub 470 such that the plunger 26 can be abutted against the plate portion 700 of the thrust plate 608. The snap ring 610 can be received in the circumferentially extending groove 482 in the actuator mount surface 480 and can inhibit axial withdrawal of the actuator assembly 10a from the mounting hub 470.

When the actuator assembly 10a is actuated, the plunger 26 will translate the thrust plate 608 such that the leg members 702 urge the second dog ring 602 toward the first dog ring 600 such that the teeth 620 and 650 of the first and second dog rings 600 and 602 engage one another. As the second dog ring 602 is non-rotatably coupled to the differential case 400 and as the first dog ring 600 is non-rotatably coupled to the second side gear 502, engagement of the teeth 620 and 650 inhibits rotation of the second side gear 502 relative to the differential case 400, thereby locking the differential assembly 352 to inhibit speed differentiation between the axle shafts 354 (FIG. 22). It will be appreciated that the tab members 760 of the anti-rotate bracket 752 can contact the sides of the adjacent bearing cap 362 (FIG. 22) to thereby inhibit or limit rotation of the actuator assembly 10a relative to the axle housing 350 (FIG. 22). It will be appreciated that as the actuator 10a is immersed in a fluid (i.e., a lubricating and cooling oil), the apertures 144 in the plunger 26 can be sized and shaped to reduce surface tension and friction, while the apertures 146 (FIGS. 15 and 27) in the plunger 26 can form ports for intaking fluid into and exhausting fluid from the armature space 70 (FIG. 27). Additionally or alternatively, the plunger 26 can be configured such that the flange member 140 (FIG. 15) can be spaced apart from the coil assembly 22 by a predetermined distance, such as 0.04 inch (1 mm) when the actuator 10a is in a non-actuated condition and the plunger 26 is fully returned toward the coil assembly 22. As those of ordinary skill in the art will appreciate, it is commonly understood that the volume of a vehicle component should be minimized to improve the packaging of the vehicle component into a particular vehicle. We have found, however, that the spacing between the flange member 140 (FIG. 15) and the coil assembly 22 can reduce surface tension and friction, particularly at when the temperature of the lubricating oil is relatively cold.

It will be appreciated that as the actuator assembly 10a is pre-programmed/calibrated, the differential assembly 352 may be assembled and tested (as necessary) without calibrating or programming the sensor assembly 28 after it has been installed to the differential case 400. Moreover, it will be appreciated that as the sensor assembly 28 directly senses a position of the armature 24 (FIG. 27) via the sensor portion 122 (FIG. 27), the sensor signal produced by the sensor assembly 28 can be employed to both identify the state in which the differential assembly 352 is operated (e.g., locked or unlocked) and the position of the armature 24 (FIG. 27). This latter information is significant in that direct sensing of the position of the armature 24 (FIG. 27) permits the controller 256 (FIG. 22) to accurately identify those situations where the armature 24 (FIG. 27) has traveled sufficiently to cause actuation of the differential assembly 352; the controller 256 (FIG. 22) may thereafter alter the manner in which electrical power is provided to the actuator assembly 10a. For example, the controller 256 (FIG. 19) may utilize a pulse-width modulating technique to provide electrical power to the actuator assembly 10a. The controller 256 (FIG. 19) can employ a first, relative high duty cycle so that the apparent voltage provided to the actuator 10a is relatively high to initiate movement of the thrust plate 608 to lock the differential assembly 352. Thereafter, the controller 256 (FIG. 19) can employ a second, relatively lower duty cycle in response to a change in the sensor signal when the sensor target 122 (FIG. 27) is positioned at the first position. In this regard, a relatively lower duty cycle can be employed to hold or maintain the actuator 10a in an actuated condition. The lower duty cycle provides a relatively lower apparent voltage and reduces energy consumption and the generation of heat by the actuator 10a.

Figure 29:
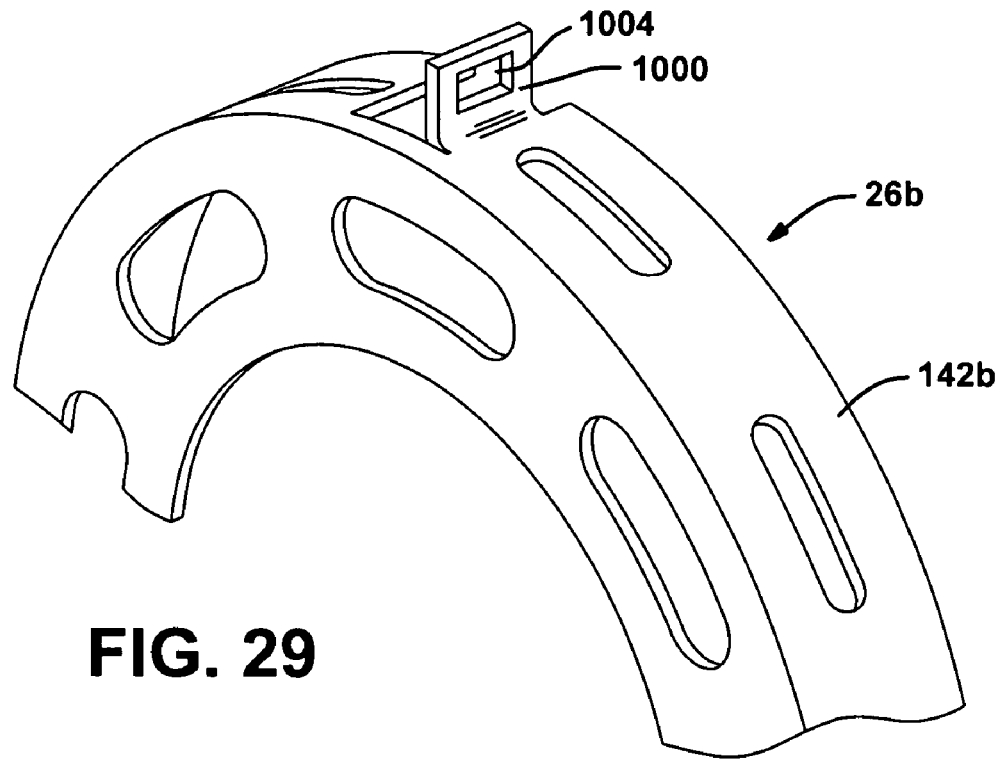
FIG. 29 is a partial perspective view of a portion of an alternatively constructed plunger.
Figure 30:
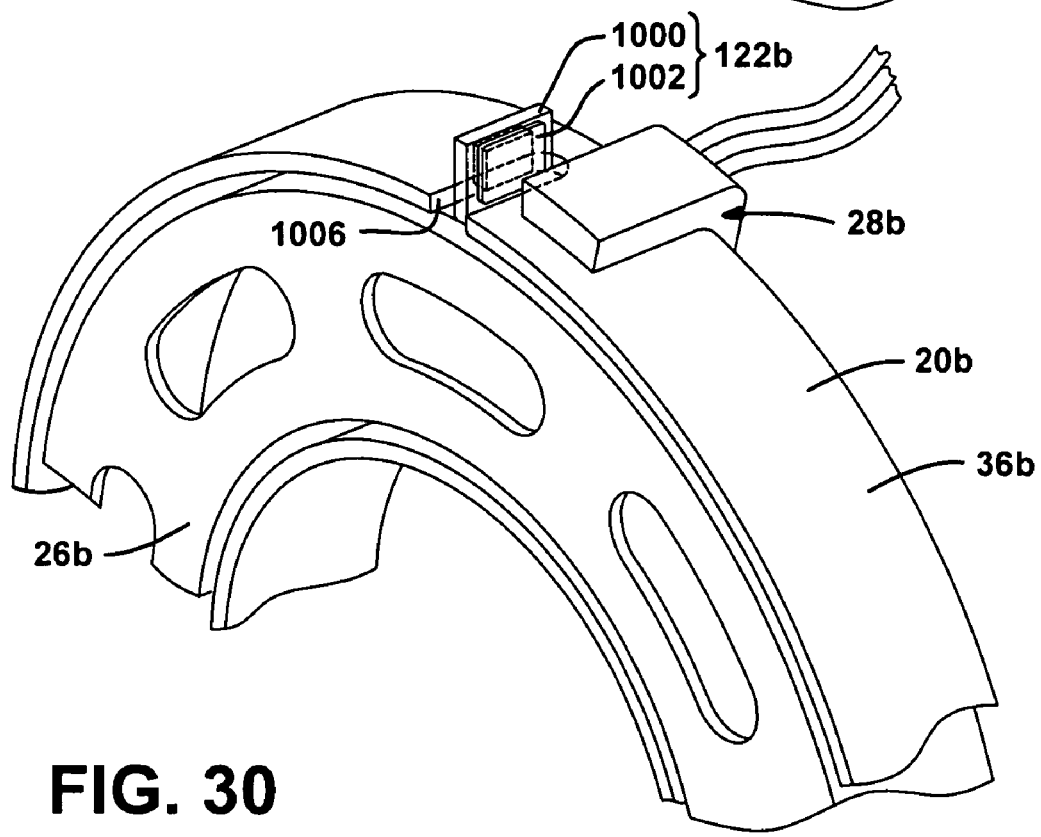
FIGS. 30 through 32 are partial schematic views illustrating the plunger of FIG. 29 as incorporated into other actuator assemblies constructed in accordance with the teachings of the present disclosure.

While the actuators 10 and 10a of FIGS. 1 and 27 have been described thus far as including an armature with an integral sensor target, those of ordinary skill in the art will appreciate that the actuator, in its broader aspects, may be constructed somewhat differently. For example, the sensor target may be directly coupled to the plunger as shown in FIGS. 29 and 30. In this arrangement, a portion of the side wall or rim member 142b of the plunger 26b can be sheared and bent outwardly to form a sensor tab 1000, while the remainder of the plunger 26b can be configured as described above. A ferro-magnetic target 1002 can be overmolded onto the sensor tab 1000. In the particular example provided, a target aperture 1004 is formed through the sensor tab 1000 and the ferro-magnetic material 1002 is overmolded onto the sensor tab 1000 in a location that corresponds to the target aperture 1004. The ferro-magnetic target 1002 and the sensor tab 1000 cooperate can cooperate to define the sensor target 122b. A slot 1006 can be formed in the second annular sidewall 36b of the frame 20b to receive the sensor tab 1000 and/or the sensor target 122b when the sensor target 122b translates axially relative to the frame 20b. The sensor assembly 28b can be coupled to the frame 20b in a manner that is similar to that which is described above and can include any appropriate type of sensor. In the particular example provided, the sensor assembly 28b includes a back-biased Hall-effect sensor, such as an AT635LSETN-T sensor marketed by Allegro MicroSystems of Worcester Mass. Further examples of suitable sensors include magnetoresistive sensors and magnetorstrictive sensors, which could be Hall-effect type sensors.

Figure 31:
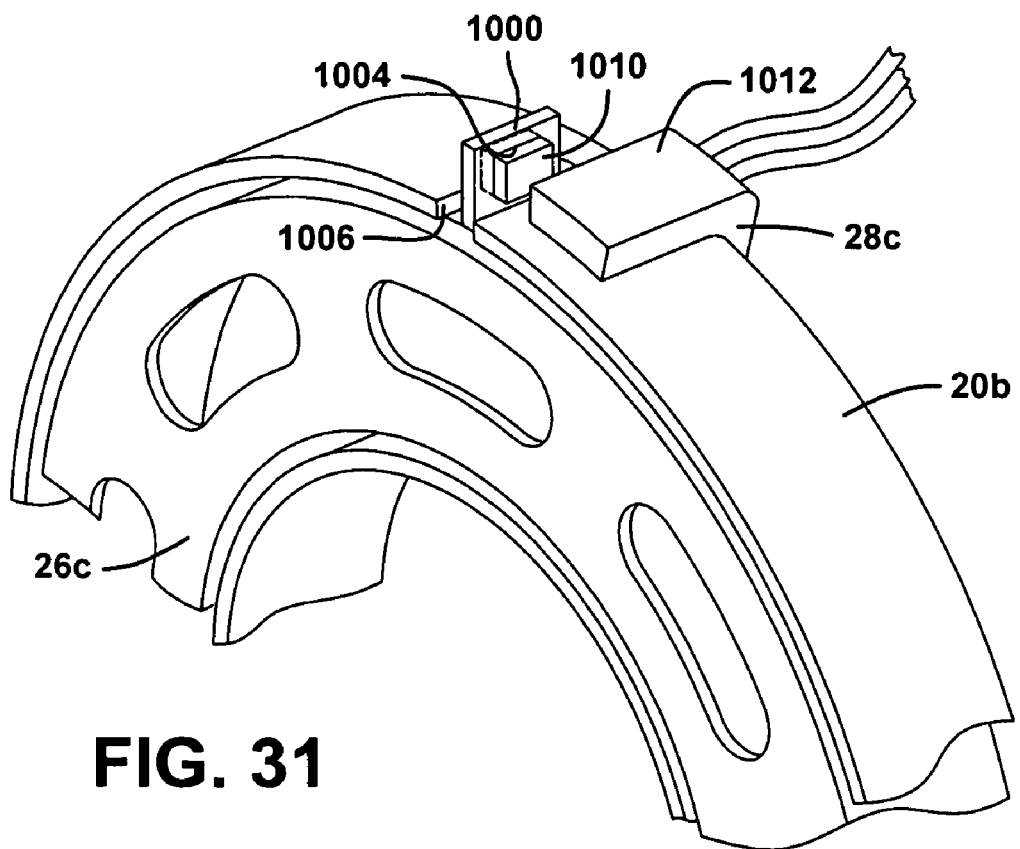
Figure 32:
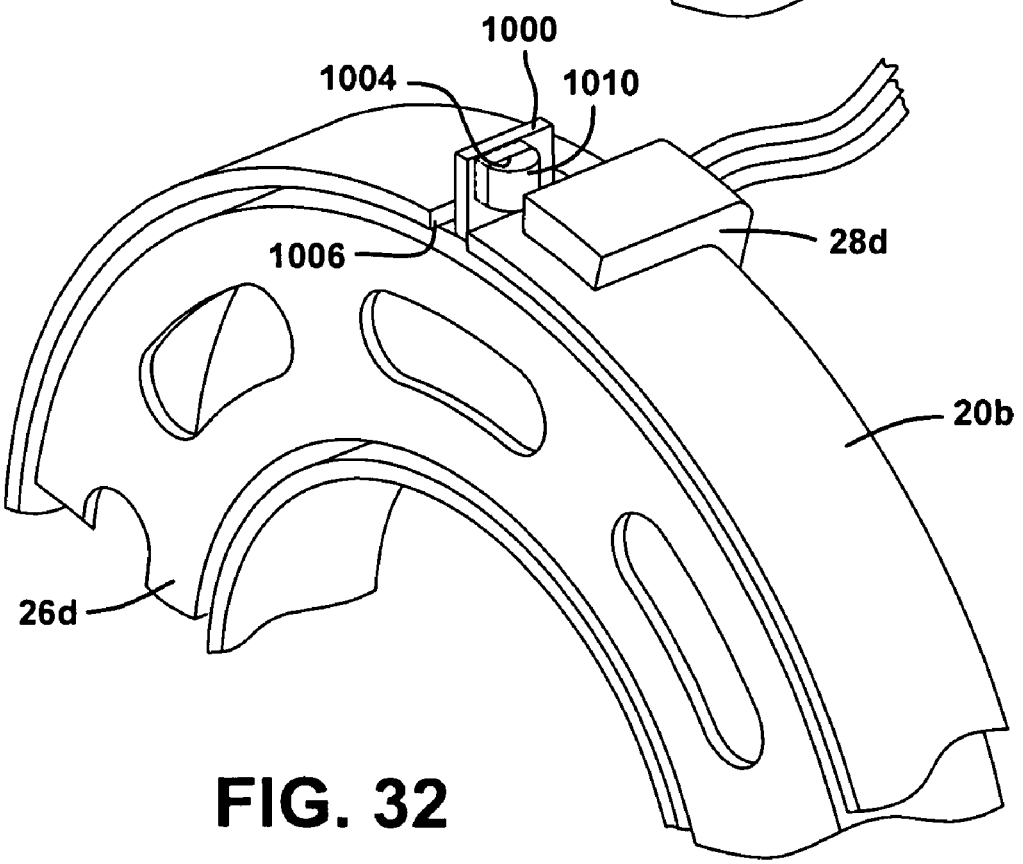

The example of FIG. 31 is similar to that which is shown in FIGS. 29 and 30, except that a forward-biasing magnet 1010 is coupled to the sensor tab 1000 rather than the overmolding of a ferro-magnetic material onto the sensor tab 1000. The forward-biasing magnet 1010 can be fitted into the target aperture 1004 and secured to the sensor tab 1000 in any desired manner, such as through adhesives, mechanical couplings and/or overmolding. The sensor assembly 28c can include a linear hall element 1012 can be coupled to the frame 20b and can cooperate with the forward-biasing magnet 1010 to identify a position of the plunger 26c relative to the frame 20b. The example of FIG. 32 is also similar to that which is shown in FIG. 31, except that the sensor assembly 28d is a magneto-resistive sensor that is coupled to the frame 20b. Those of ordinary skill in the art will appreciate that the magnet 1010 can have any appropriate shape.

It will be appreciated that the arrangements of FIGS. 30 through 32 orient the sensor assembly in a manner that is generally perpendicular to an apparent magnetic field of the sensor target. Construction in this manner can help the sensor assembly to be relatively more tolerant of fluctuations in the magnitude of magnetic field of the sensor target.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. An electromagnetic actuator assembly comprising:
   a frame member having an outer sidewall, an inner sidewall and a first end wall that is coupled to the inner and outer sidewalls, the frame member defining an interior annular cavity;
   a coil assembly mounted in the annular cavity, the coil assembly including a core and a coil;
   a plunger having an annular intermediate wall and a second end wall that extends radially inwardly from the intermediate wall, the intermediate wall being disposed radially between the coil assembly and the outer sidewall;
   an armature that abuts the plunger;
   a sensor target coupled to one of the armature and the plunger; and
   a sensor mounted to the frame, the sensor being configured to directly sense a position of the sensor target and to produce a first sensor signal when the sensor target is moved in a first direction past a first position and the sensor is in a first state.

2. The electromagnetic actuator assembly of claim 1, wherein the frame member defines a sensor mount and wherein the sensor is located in the sensor mount.

3. The electromagnetic actuator assembly of claim 2, wherein the sensor mount includes a slotted aperture that is formed in the outer sidewall and the first end wall.

4. The electromagnetic actuator assembly of claim 1, wherein an overmold fixedly couples the sensor to the frame member.

5. The electromagnetic actuator assembly of claim 1, further comprising a bushing that abuts the inner sidewall of the frame member.

6. The electromagnetic actuator assembly of claim 1, wherein the armature includes a tapered circumferentially extending face and the core includes a mating tapered circumferentially extending face.

7. The electromagnetic actuator assembly of claim 6, wherein an angle at which the tapered circumferentially extending face intersects an axis along which the armature travels is 15° to 45°.

8. The electromagnetic actuator assembly of claim 1, wherein the sensor is also configured to produce a second sensor signal when the sensor target is moved in a second direction past a second position and the sensor is in a second state, the second direction being opposite the first direction, the second position being different than the first position by a predetermined offset.

9. The electromagnetic actuator assembly of claim 1, wherein the sensor is a Hall-effect sensor.

10. The electromagnetic actuator assembly of claim 9, wherein the Hall-effect sensor is a back-biased programmable digital Hall-effect sensor.

11. The electromagnetic actuator assembly of claim 1, wherein the sensor is a magnetostrictive sensor.

12. The electromagnetic actuator assembly of claim 11, wherein the magnetostrictive sensor is a magnetostrictive Hall-effect sensor.

13. The electromagnetic actuator assembly of claim 1, wherein the sensor is a magnetoresistive sensor.

14. The electromagnetic actuator assembly of claim 13, wherein the magnetoresistive sensor is a magnetoresistive Hall-effect sensor.

15. The electromagnetic actuator assembly of claim 1, wherein the sensor includes another sensor, the another sensor being configured to sense the position of the sensor target and to produce a second sensor signal when the sensor target is moved in the first direction past the first position and the another sensor is in a first state.

16. The electromagnetic actuator assembly of claim 1, wherein the sensor target is formed on the armature.

17. The electromagnetic actuator assembly of claim 1, wherein the sensor target includes a magnet and wherein the sensor is oriented generally perpendicular to an apparent magnetic field of the magnet.

18. A method comprising:
providing an actuator having a frame member, a coil assembly, a plunger, an armature and a sensor target, the frame member having an outer sidewall, an inner sidewall and a first end wall that is coupled to the inner and outer sidewalls, the frame member defining an interior annular cavity, the coil assembly being mounted in the annular cavity and including a core and a coil, the plunger having an annular intermediate wall and a second end wall that extends radially inwardly from the intermediate wall, the intermediate wall being disposed radially between the coil assembly and the outer sidewall, the armature being coupled to the intermediate wall, the sensor target being directly coupled to one of the armature and the plunger and extending radially outwardly of the intermediate wall; and
directly sensing a position of the sensor target relative to the frame member.

19. The method of claim 18, wherein prior to sensing the position of the sensor target the method includes fixedly coupling a sensor to the frame member.

20. The method of claim 19, wherein the sensor is a Hall-effect sensor.

21. The method of claim 20, wherein the sensor is a back-biased programmable digital Hall-effect sensor.

22. The method of claim 19, wherein the sensor is a magnetostrictive sensor.

23. The method of claim 19, wherein the sensor is a magnetoresistive sensor.

24. The method of claim 19, wherein fixedly coupling the sensor to the frame member includes encapsulating at least a portion of the sensor and at least a portion of the actuator in a plastic material.

25. The method of claim 19, further comprising programming the sensor to produce a first signal when the sensor target is moved in a first direction past a first position.

26. The method of claim 25, further comprising programming the sensor to produce a second sensor signal when the sensor target is moved in a second direction past a second position, the second direction being opposite the first direction, the second position being different than the first position by a predetermined offset.

27. The method of claim 18, wherein the sensor target is integrally formed with the armature.

28. An electromagnetic actuator comprising:
a frame member, the frame member including an annular outer sidewall and an inner sidewall;
a coil assembly received between the outer and inner sidewalls, the coil assembly being selectively operable in an operative condition for generating a magnetic field;
a plunger, the plunger being an annular structure received between the outer and inner sidewalls; and
an armature that is disposed between the frame member and the plunger, the armature being configured to translate in a direction opposite the frame when the coil assembly is operated in the operative condition, the armature engaging the plunger so that the plunger moves with the armature when the armature is moved in the direction opposite the frame;
wherein a space is disposed between the coil assembly, the plunger and the armature and wherein at least one aperture is formed axially through the plunger to vent the space.

29. The electromagnetic actuator of claim 28, wherein the armature includes a body portion and a circumferentially extending projection that extends radially outwardly from the body portion and wherein the plunger includes a side wall having an end that abuts the projection.

30. The electromagnetic actuator of claim 29, wherein side wall also abuts the body portion.

* * * * *

UNITED STATES PATENT AND TRADEMARK OFFICE
CERTIFICATE OF CORRECTION

PATENT NO. : 7,602,271 B2 Page 1 of 1
APPLICATION NO. : 11/507311
DATED : October 13, 2009
INVENTOR(S) : York et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this

Fifth Day of October, 2010

David J. Kappos
*Director of the United States Patent and Trademark Office*